INVENTORS
GUILLERMO PEREZ
PHILIP S. RAND
JACOB A. RANDMER
BY Isidore Match
ATTORNEY Oct. 10, 1961　　　G. PEREZ ET AL　　　3,003,633
RECORD CARD SORTING MACHINE
Filed July 23, 1956　　　　　　　　　　　　24 Sheets-Sheet 3

INVENTORS
GUILLERMO PEREZ
PHILIP S. RAND
JACOB A. RANDMER
BY Isidore Match
ATTORNEY Oct. 10, 1961 G. PEREZ ET AL 3,003,633
RECORD CARD SORTING MACHINE
Filed July 23, 1956 24 Sheets-Sheet 4

INVENTORS
GUILLERMO PEREZ
PHILIP S. RAND
JACOB A. RANDMER
BY Isidore Match
ATTORNEY

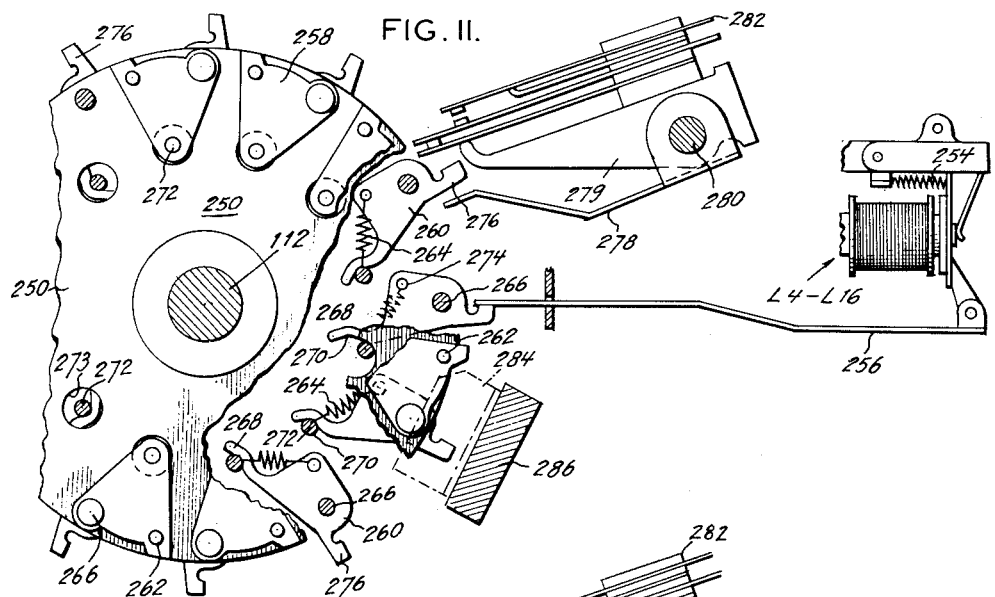
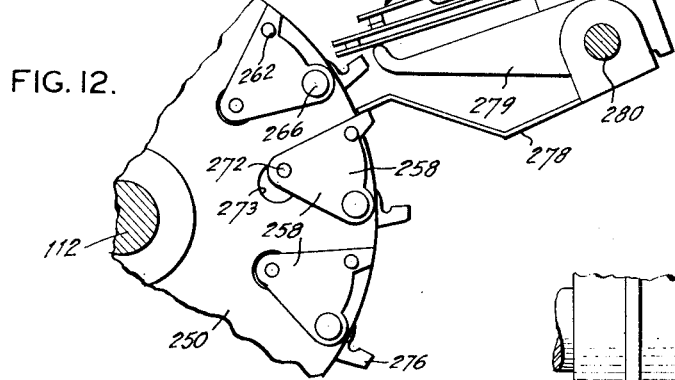
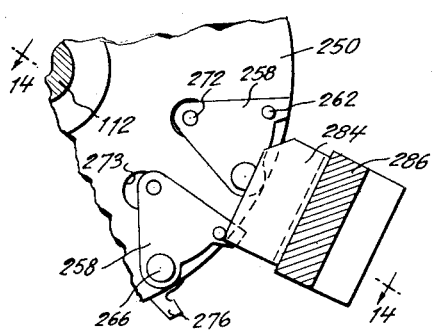
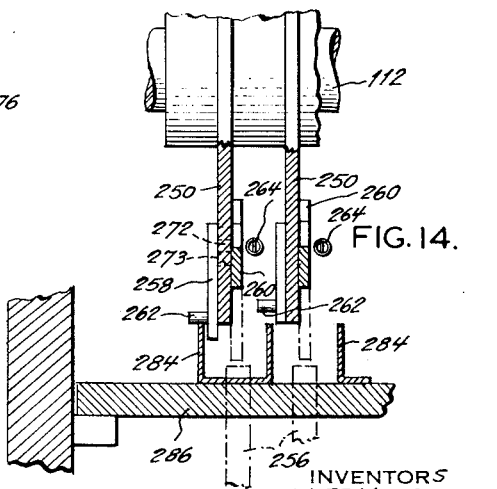

Oct. 10, 1961  G. PEREZ ET AL  3,003,633
RECORD CARD SORTING MACHINE
Filed July 23, 1956  24 Sheets-Sheet 10

INVENTORS
GUILLERMO PEREZ
PHILIP S. RAND
BY JACOB A. RANDMER

Isidore Match
ATTORNEY

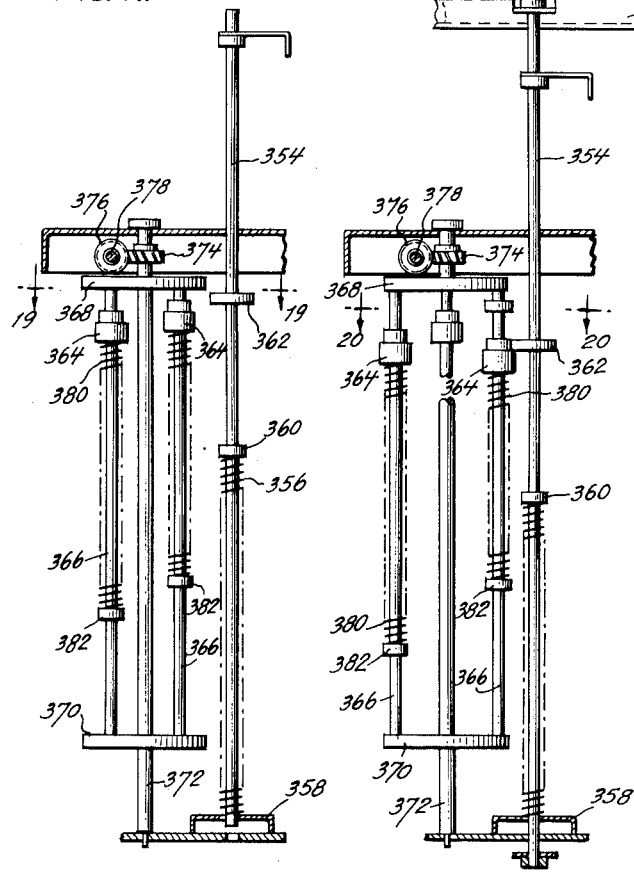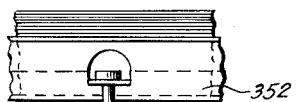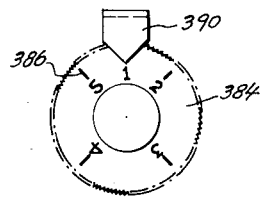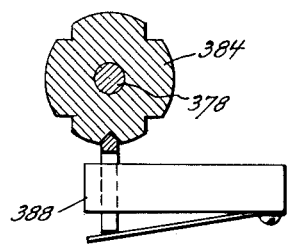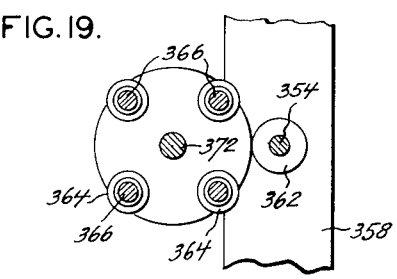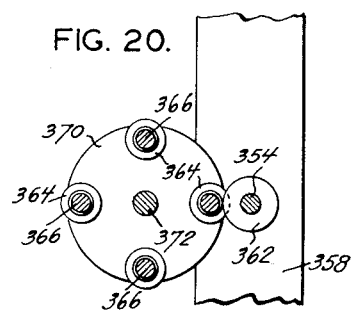

Oct. 10, 1961    G. PEREZ ET AL    3,003,633
RECORD CARD SORTING MACHINE
Filed July 23, 1956    24 Sheets-Sheet 12

INVENTORS
GUILLERMO PEREZ
PHILIP S. RAND
BY JACOB A. RANDMER

Isidore Match

ATTORNEY

Oct. 10, 1961  G. PEREZ ET AL  3,003,633
RECORD CARD SORTING MACHINE
Filed July 23, 1956  24 Sheets-Sheet 16

INVENTORS
GUILLERMO PEREZ
PHILIP S. RAND
JACOB A. RANDMER
BY Isidore Match
ATTORNEY

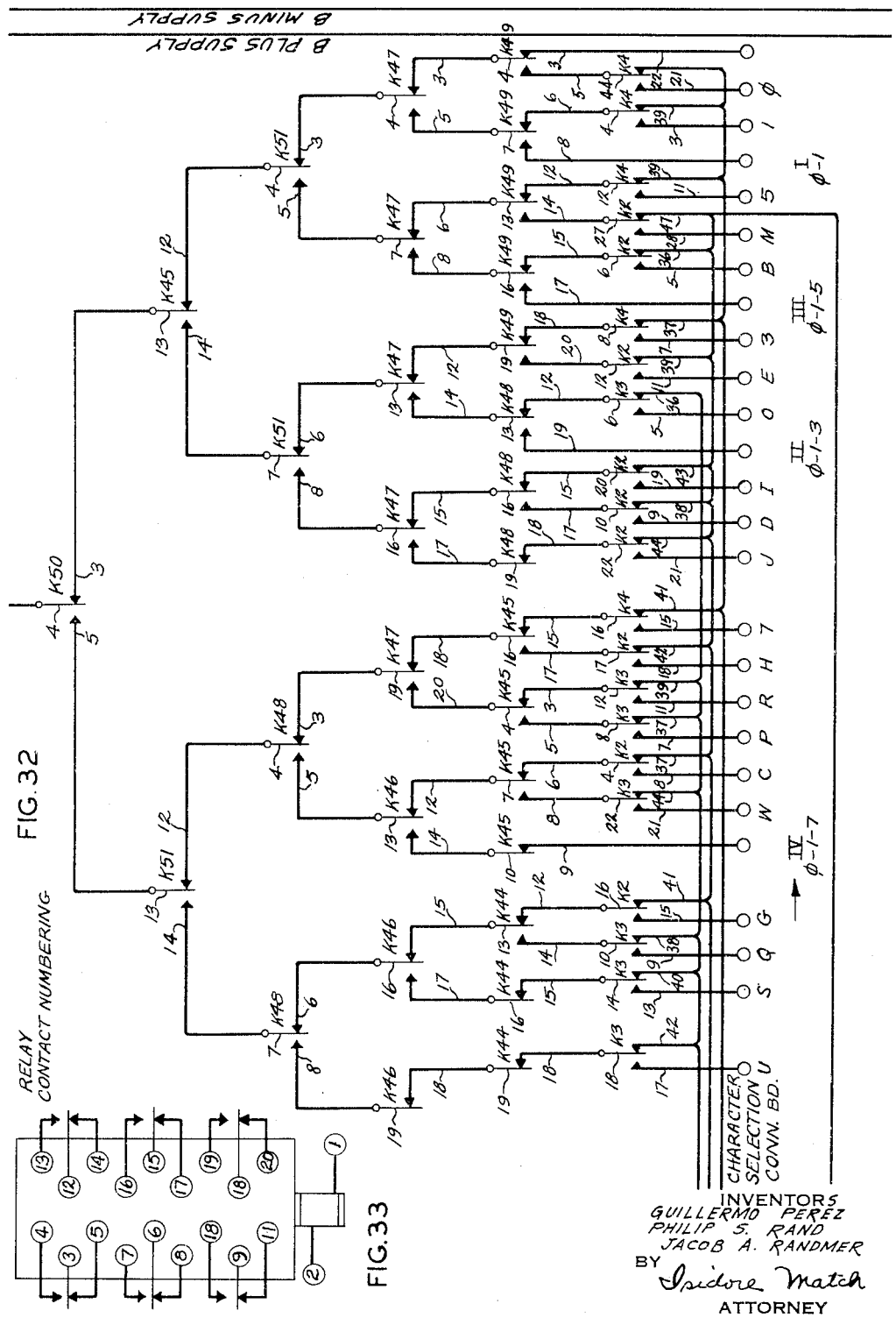

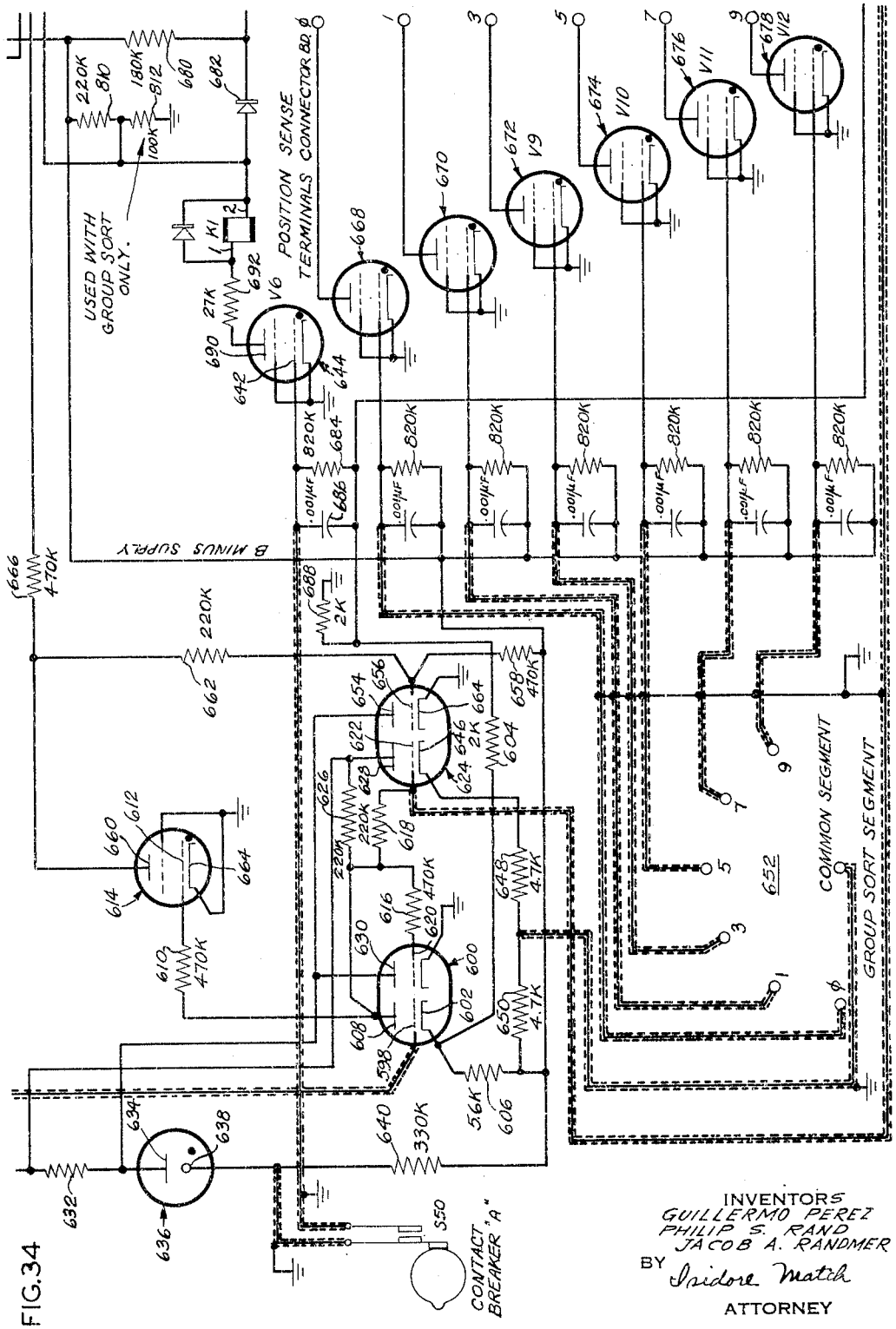

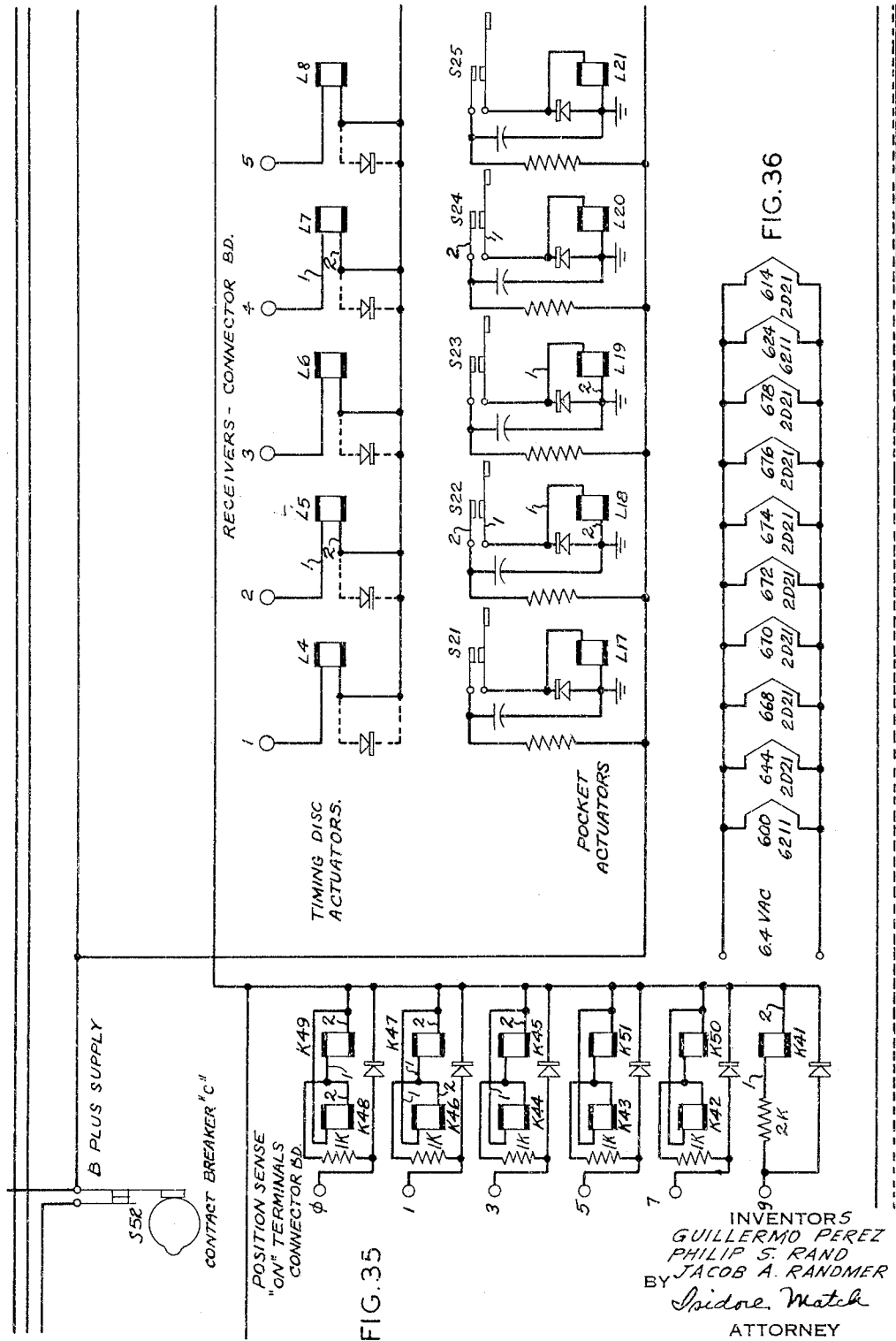

FIG. 37

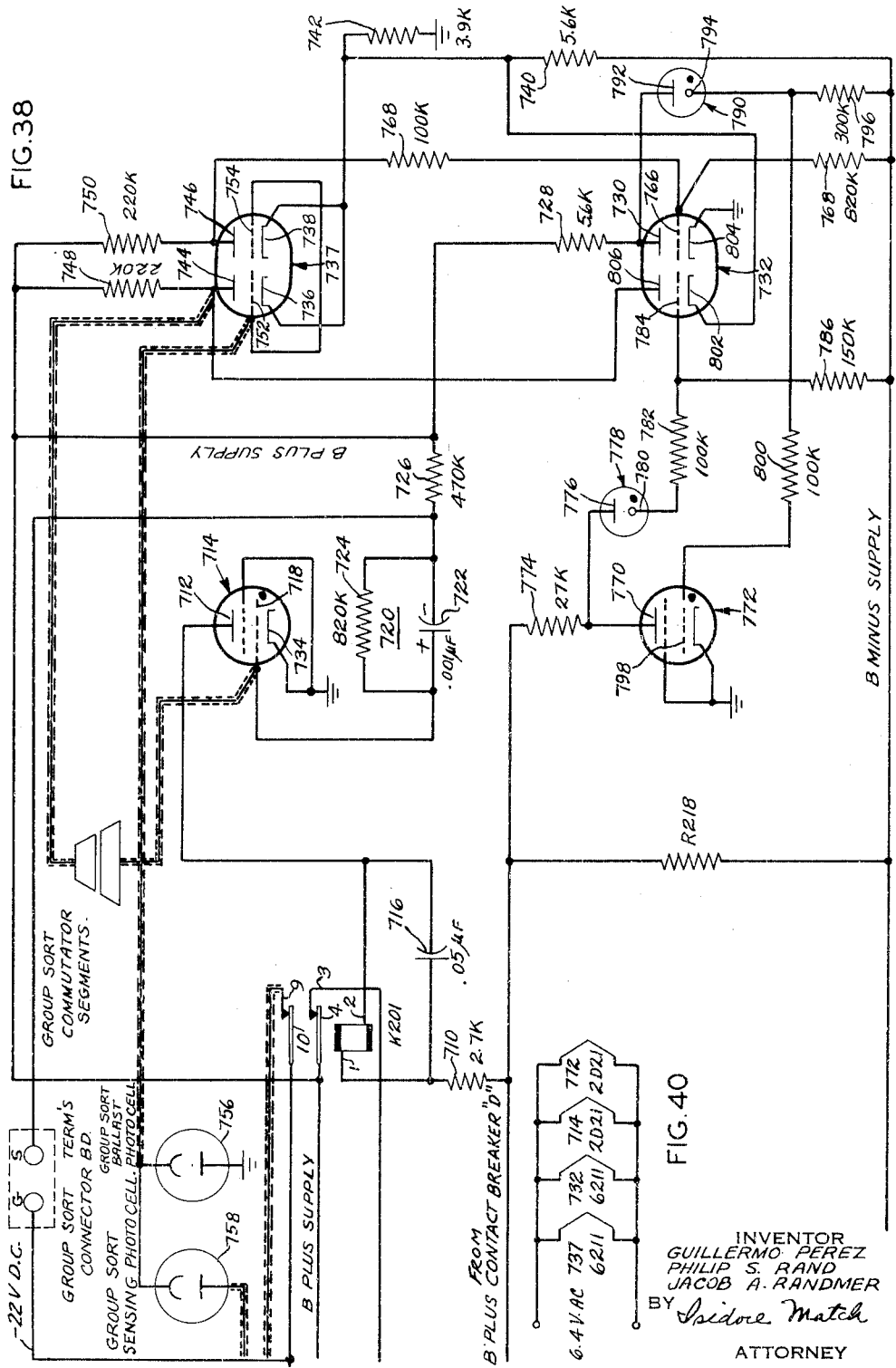

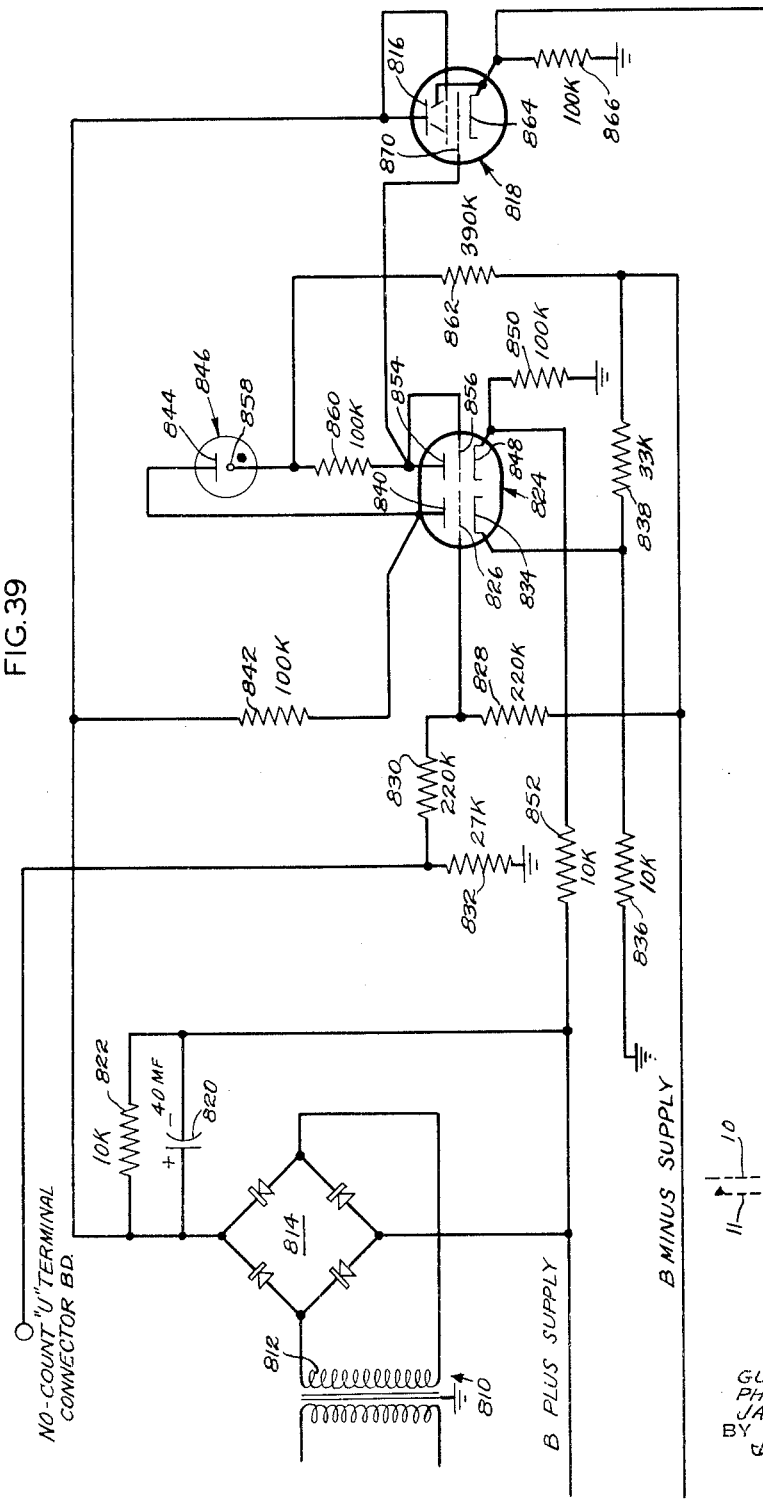

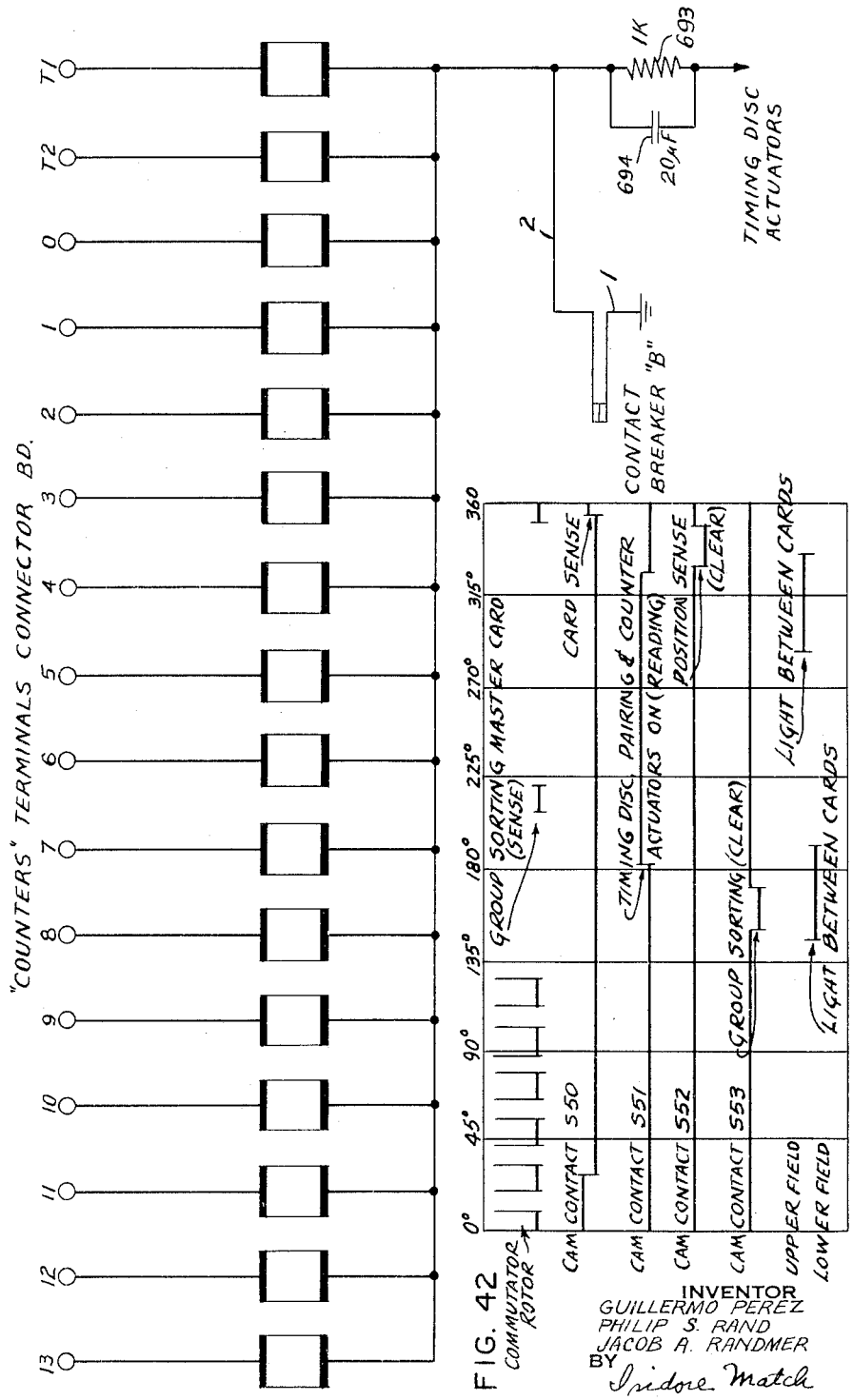

_United States Patent Office_

3,003,633
Patented Oct. 10, 1961

3,003,633
RECORD CARD SORTING MACHINE
Guillermo Perez, Hartford, Philip S. Rand, Redding Ridge, and Jacob A. Randmer, South Norwalk, Conn., assignors to Sperry Rand Corporation, New York, N.Y., a corporation of Delaware
Filed July 23, 1956, Ser. No. 599,385
32 Claims. (Cl. 209—111.5)

This invention relates to punched card sorting machines and more particularly to such a machine capable of sensing and sorting cards at high speed with a high degree of accuracy and efficiency.

The primary object of the invention is to provide an accurate and high speed sorting machine wherein the use of photoresponsive means for sensing perforations in a card and electrical circuitry responsive thereto makes possible the sensing and sorting of a continuously moving file of relatively closely spaced cards at great speed.

Another object of the invention is to provide a machine in accordance with the preceding object which is adaptable for a multiplicity of sorting operations.

Generally speaking, in accordance with this invention, there is provided a machine for sorting records bearing characters in the form of one or more card perforations arranged in columns on the cards which comprises means for continually feeding the cards into the machine of uniformly spaced intervals. Sensing means comprising a light source and photoresponsive means disposed in opposed relationship is provided whereby the registration of the light source, a card perforation, and the photoresponsive means actuates the latter. The machine contains a plurality of card receptacles which receives the sensed cards. Means are provided for conveying the cards from the card feeding means through a position between the light source and the photoresponsive means to the receptacle. Means responsive to the photoresponsive means selects and determines the time of the opening of a particular receptacle for receiving a card in accordance with the information sensed therefrom.

For a better understanding of the present invention together with other and further objects thereof, reference is had to the following description taken in connection with the following drawings and its scope will be pointed out in the appended claims.

In the drawings, FIG. 1 is a fragmentary front elevation showing the right portion of the machine;

FIG. 11 is a view, partly cut away, of the timing mechanism;

FIG. 12 is a fragmentary view of the timing mechanism;

FIG. 13 is a fragmentary view similar to FIG. 12 including the cam timing pawl restoring mechanism;

FIG. 14 is a view, partly in section, taken along lines 14—14 of FIG. 13;

FIG. 15 is a view, partly in section, taken along lines 15—15 of FIG. 1;

FIG. 17 is a view, partly in section, taken along line 17—17 of FIG. 16 looking in the direction of the arrows;

FIG. 18 is a view similar to FIG. 17 but illustrating the spring tension means set for increased tension against the card receiving platform, the platform shaft being in slightly depressed position by the weight of the cards thereon;

FIG. 19 is a view, partly in section, taken along line 19—19 of FIG. 17 looking in the direction of the arrows;

FIG. 20 is a view, partly in section, taken along line 20—20 of FIG. 18 looking in the direction of the arrows;

FIG. 21 is an end elevation of the spring tension control dial;

FIG. 22 is a sectional detail along line 22—22 of FIG. 16 showing the detent means for the control dial;

Figure 27:
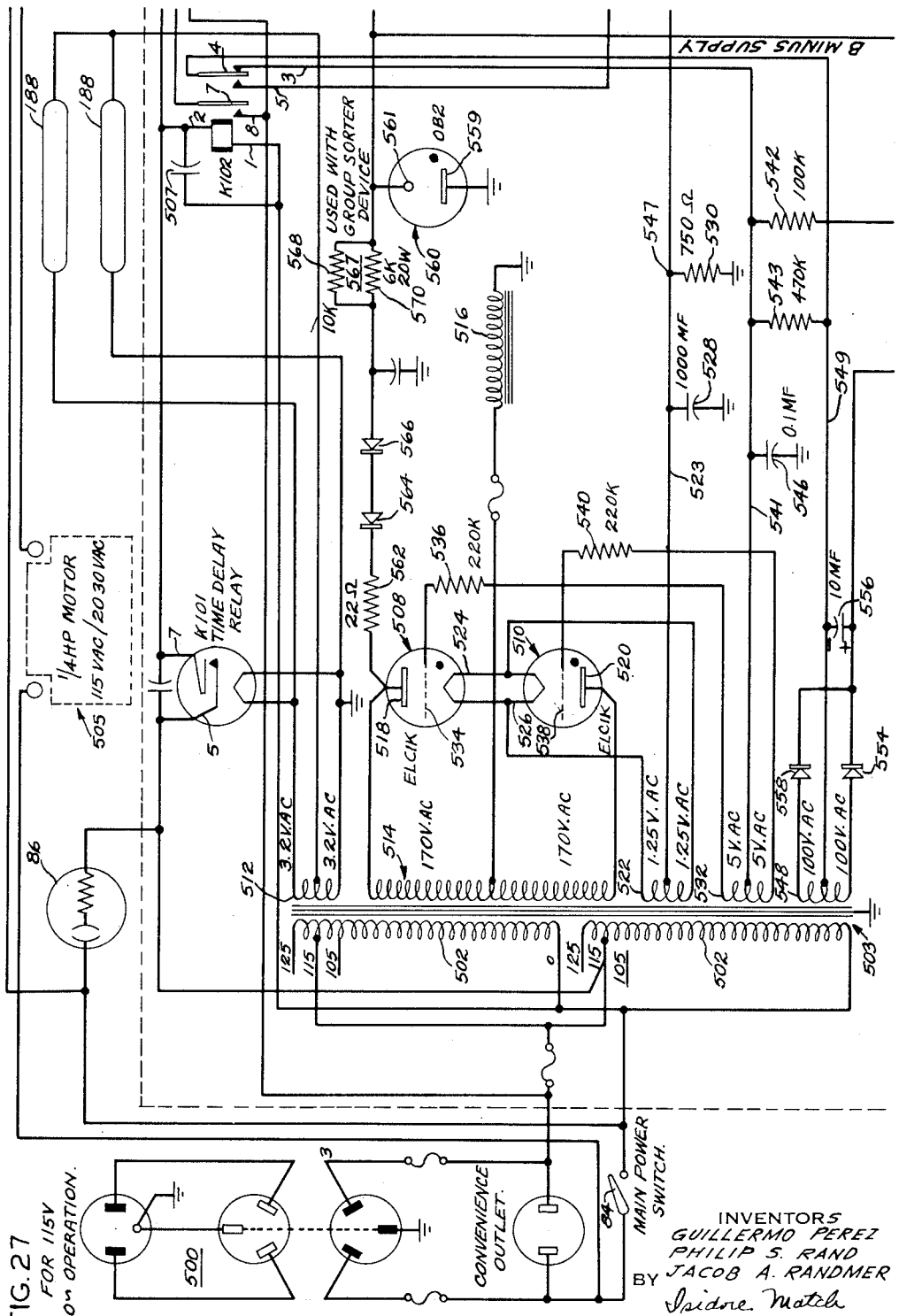
Figure 28:
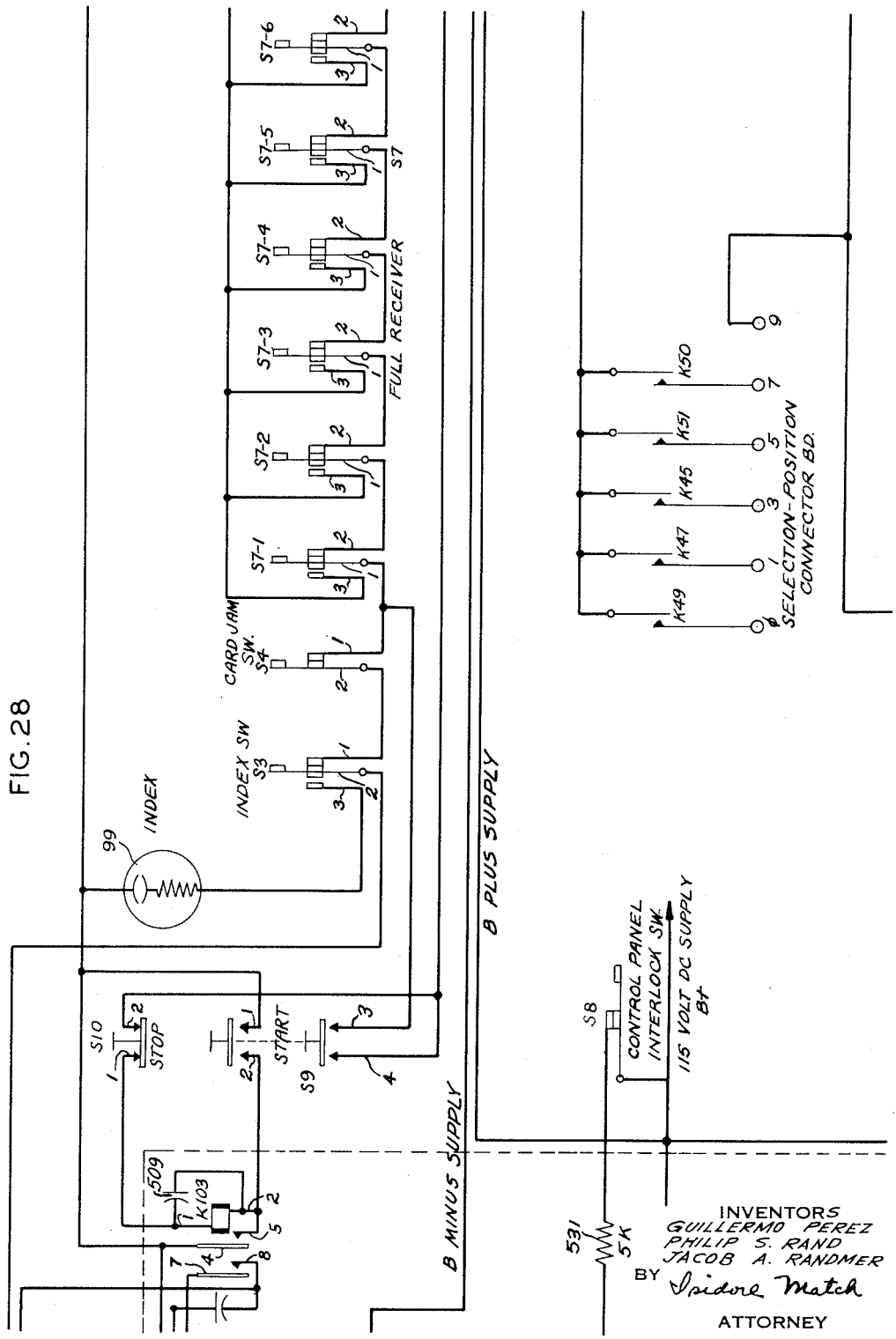
Figure 29:
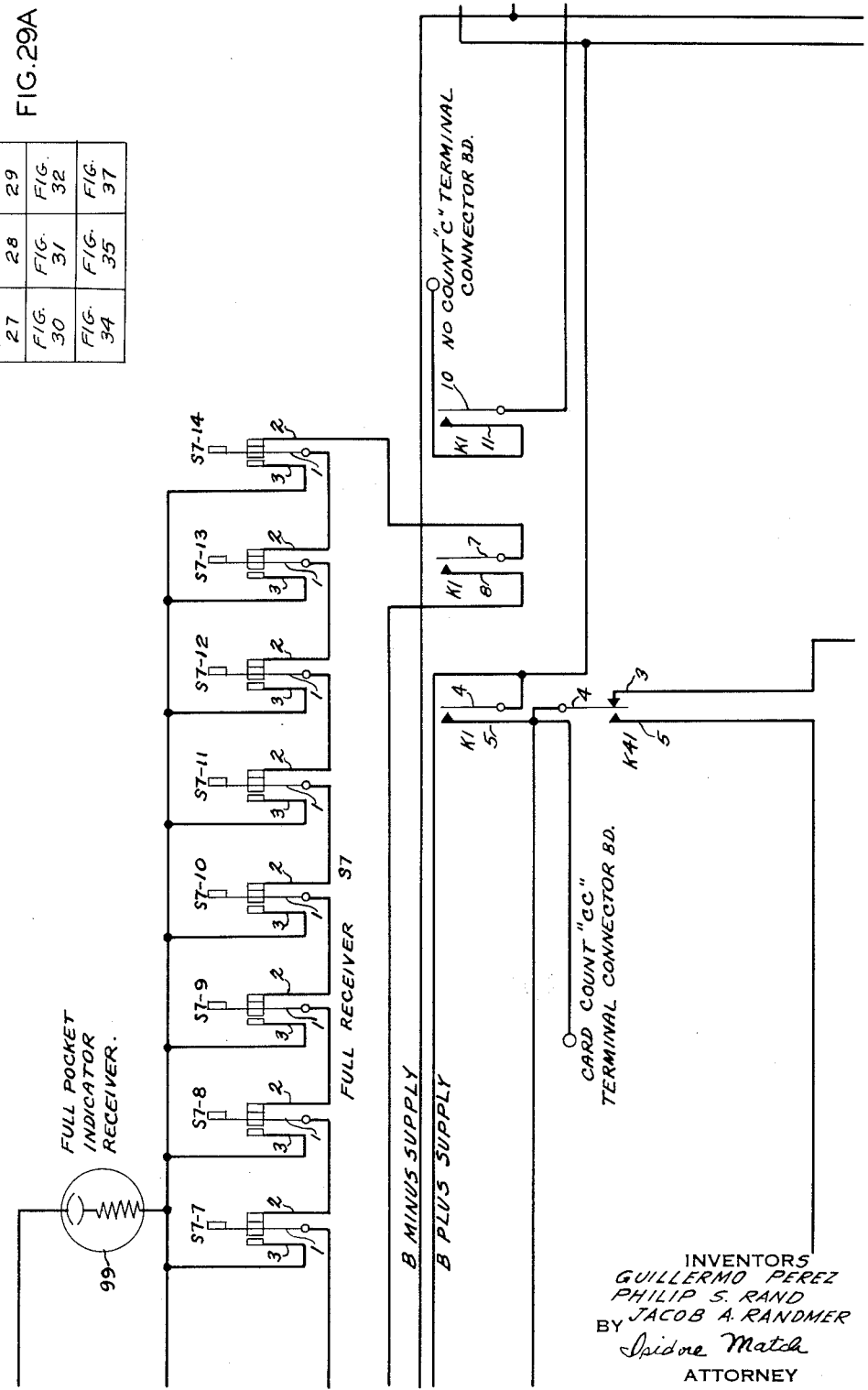

FIGS. 27–37, taken together as arranged in the diagram of FIG. 29A, represent a schematic diagram of the electrical circuitry utilized in the sensing, decoding and timing mechanisms of the machine;

FIG. 38 is a schematic diagram of the circuits utilized in the group sorting operation in conjunction with the circuit depicted in FIGS. 27–37;

FIGS. 39 and 39A are schematic diagrams of the nullified count circuit used in the invention;

FIG. 40 is a diagram illustrating the heater voltage arrangements for the electron discharge tubes shown in the circuit of FIG. 38;

FIG. 41 shows the arrangement of counter actuators utilized in the counting operation of the invention; and FIG. 42 is a diagram showing the timing of the various circuit timing elements.

Figure 1:
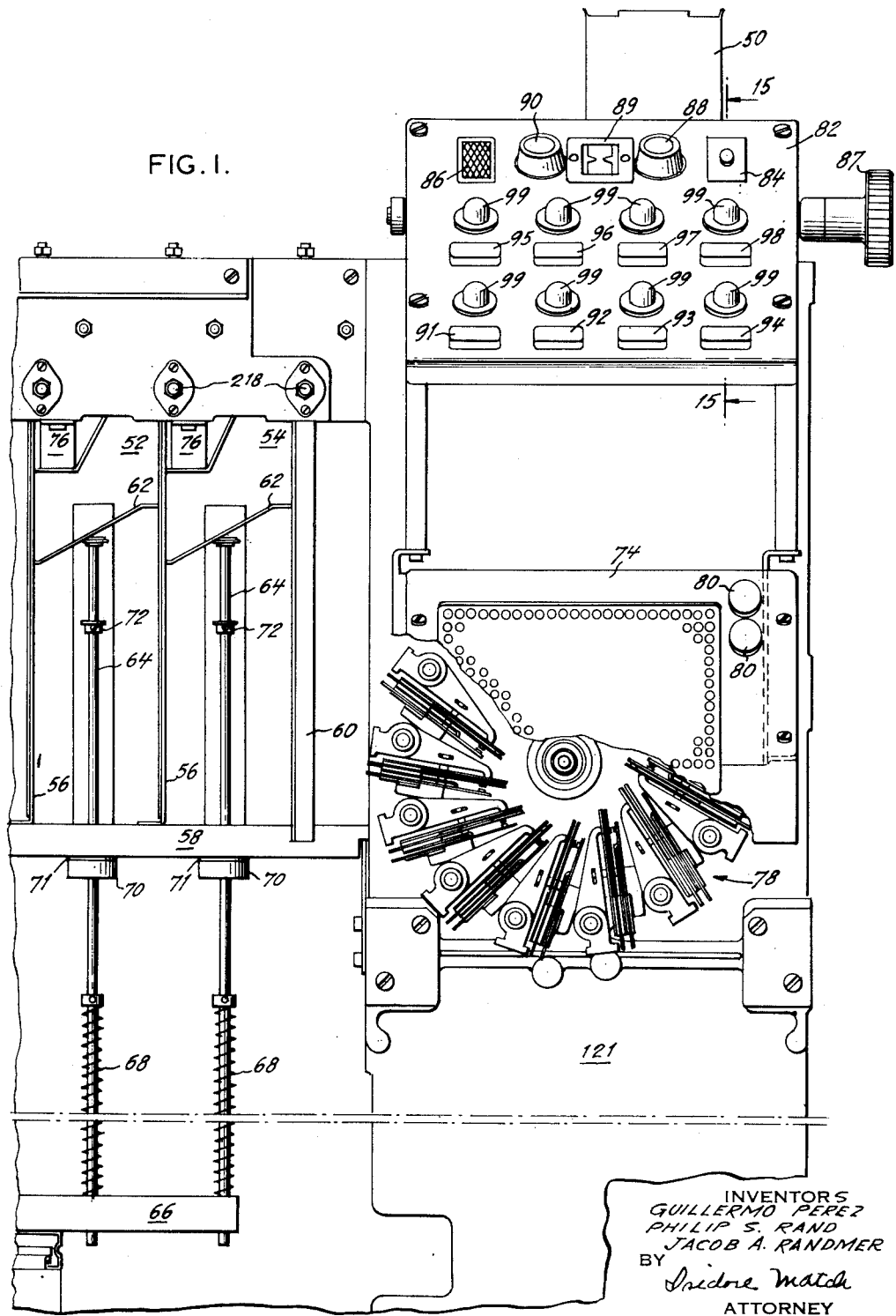
Figure 2:
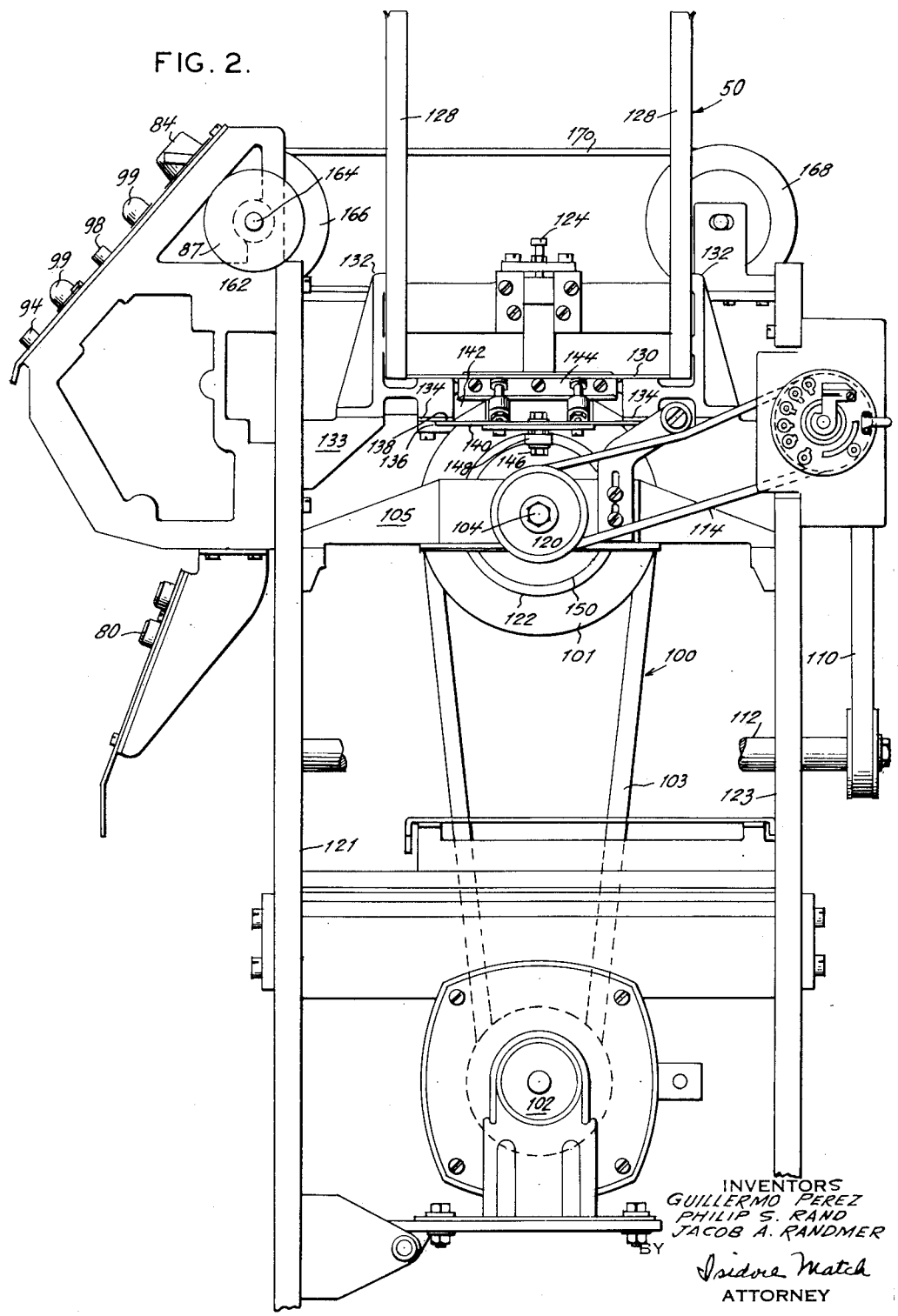
FIG. 2 is a view looking from the right of FIG. 1.

Referring now particularly to FIG. 1 the card magazine 50 feeds the file of cards to be sorted. In the usual sorting operation, the cards are placed in this magazine face up with the upper half edge leading into the machine.

The sensing section not visible in FIG. 1 is located beneath the top cover at the right end of the machine just to the left of card feeding magazine 50. Individual cards are fed from magazine 50 into this section where they pass beneath photoelectric cells for the sensing of the punched holes before being ejected into the card receiving area.

There are fourteen card receiving pockets of which the two immediately to the left of the sensing section are shown, designated by numerals 52 and 54. The fourteenth pocket is the reject pocket adapted to receive those cards not sensed.

The pockets are of suitable construction and are located in successive order, the one following the other progressively toward the left end of the machine. Each pocket is partitioned from the one immediately preceding it by suitable vertical partitioning walls or brackets 56 properly secured in the machine framework. Brackets 56 are secured at their upper ends to suitable cross bars (not shown) of the framing, and are mounted at their lower ends upon a floor plate 58 which is common to the several pockets and is secured in the framing about midway of the height of the machine. The first and last pockets are also provided respectively with a wall 60 suitably secured in the framework.

In each pocket, there is provided a card landing shelf 62 which is disposed in a position inclined downwardly to the left. The angle of inclination is intended for best card stacking results to approximate that angle of descent taken by a card as it is carried into the pocket. Each shelf 62 is carried atop a vertically disposed rod 64, the rod being adapted for vertical slidable movement and is guided for such movement by suitable holes in the floor plate 58 as well as holes in a lower horizontally disposed base plate 66. Each rod 64 is supported in a proper elevated position by a compression spring 68. The arrangement is such, that each card as it enters the pocket, does so at a angle and drops in an orderly manner upon the card shelf 62. The weight of the pile of cards forces shelf 62 down thereby compressing spring 68. Upon removal of the cards, shelf 62 automatically springs back to its normally raised position.

The elevated position of the shelves is limited by respective stops 70 carried upon the rod and adapted to limit against the underside of the floor plate 58. The height of the shelf 62 may be adjusted up or down by an adjusting screw 72 for best card receiving results in order to insure proper card piling. A resilient portion 71, such as rubber, is provided on the upper surface of stop 70 to eliminate noise and banging that would otherwise occur upon the springing of the card shelf to normal position following removal of the stacked cards.

A card is fed to its related card receiver according to the punched code or position sensed at the time the card is fed into the machine and according to the setting of various of the operating controls, and the wiring of the connection panel 74. If a card is not directed to a controlled card pocket, it will feed through the machine to the reject card pocket.

The feeding of a card is a continuous, uninterrupted operation. A card from the bottom of the stack of the cards in the card feeding magazine passes through the sensing section to its card pocket without stopping. As a card enters from the card feeding magazine 50, a photosensitive cell scans the card column on which sorting is taking place. As a result of this sensing operation, a selection is generated in the machine. An electrical impulse representing the selection, wired on the connection panel to a card pocket, instantaneously sets up mechanism causing the desired card pocket to receive that card.

When the card gets to within about ⅝ inch from its card pocket, the card gate for that pocket opens and the card is fed thereinto. When a card gate is closed, its upper surface becomes part of the base of the channel along which the card is fed. When a card gate is open, its undersurface acts as a deflector to guide the card into that card pocket. There is shown in FIG. 1, the electromagnet pocket gate actuating arrangement 76 which is shown in greater detail in other figures. A portions of the timing mechanism 78 of the machine is shown located behind connection panel 74. Also shown on connection panel 74 are suitable fuses 80.

A control panel 82 is located in the upper portion of the right front of the machine. This panel contains the means of starting and stopping the machine operation, setting the machine for upper or for lower half card column sorting, and determining whether the machine is to sort alphabetically or numerically. Of course, the latter is contingent upon the wiring of connection panel 74.

A power switch 84 may suitably be a toggle type electrical switch located in the upper right corner of the control panel. A power indicator light 86 is located in the upper left corner of the panel which may suitably show a colored light when power switch 84 is turned on. The start control 88 may conveniently be a button type control located just to the left of switch 84 at the top of the panel. With a supply of cards in card feeding magazine 50, this control may be depressed momentarily to start the card feeding operation by turning on the current to the motor. A stop control 90, which may also suitably be a button type control, is located just to the right of light 86. Stop control 90 permits optional stopping of the card feeding operation by a momentary depression thereof. The keys forming the lower row on control panel 82 determine the range of basic punch codes to be sorted according to the wiring of the connection panel. Thus, key 91 may be utilized to set the machine to sort a numerical selection viz., 0 to 9, key 92 for sorting A–M, key 93 for sorting N–Z and key 94 for releasing any of the three keys to its left, i.e., a clear key. The middle row of controls comprising keys 95, 96, and 97 are utilized in unlocking the index wheel, or for setting the machine for upper or lower half card column sorting respectively. Key 98 is for clearing keys 95, 96, and 97. The indicator lights 99 above corresponding keys are provided to indicate that a given key is depressed. When one or more of the card pockets becomes filled to capacity, the current to the motor shuts off.

Figure 4:
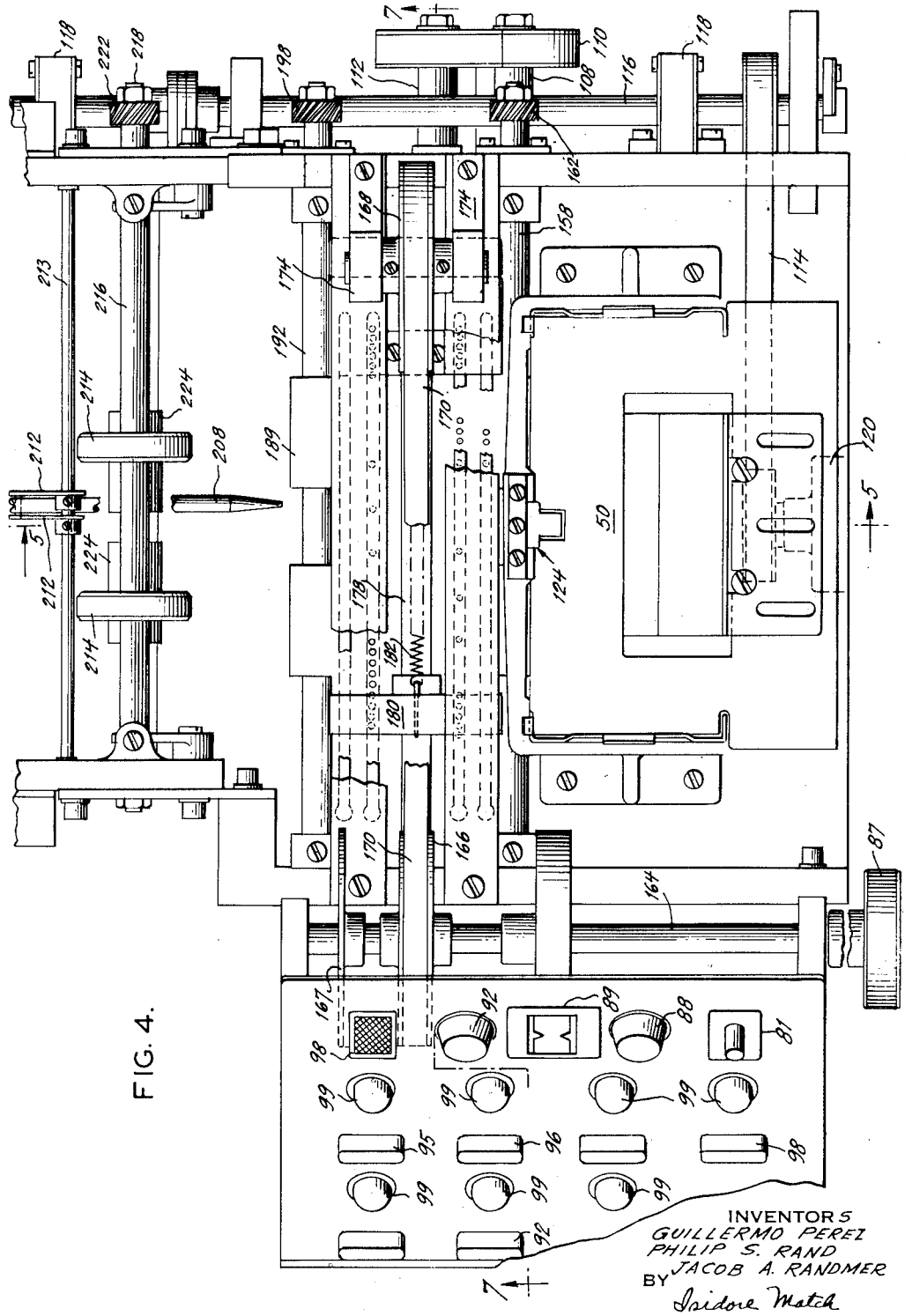
FIG. 4 is a plan view of the right portion of the machine.

A column indicator scale 89, see also FIG. 4, is located beneath a transparent cover in the upper center of control panel 82. The scale consists of two rows of card column numbers (opposing upper and lower half) around the outside of a circular dial. The opposing upper and lower half card column setting is shown by an indicator. The index wheel 87 is used to make the setting for the desired sorting operation.

The selector is set for the particular card column on which the sorting is to occur by the pressing of the upper key 96 or lower key 97 on control panel 82, and holding index key 95 depressed while turning index wheel 87 to the card column desired, the index wheel being turned until the proper column appears on indicator scale 89, and then releasing index key 95.

FRAMEWORK AND DRIVE

FIGS. 2–6

The various mechanisms of the machine, including the reciprocating card feed mechanism, the card sensing unit of the sensing system, the timing means and the card conveyor system are driven by various gears on shafts connected by a plurality of pulley and belt means and interlinking gears to a suitable motor and are adapted to turn in proper synchronism with one or another and in time relation to the movement, sensing, decoding and pocketing of a statistical card.

Referring now to the figures, the pulley and belt means 100 comprising a pulley 101 and belt 103, connects a motor 102 to the main horizontal drive shaft 104. Drive shaft 104 is supported by a bracket 105 carried by frame section 121 and 123. Drive shaft 104 is connected by a suitable intermediate shaft worm drive gear 106 to a horizontal intermediate shaft 108 disposed perpendicularly to drive shaft 104. Drive shaft 108 is coupled by a belt and pulley means 110 to a horizontal timing disc shaft 112 mounted in a bracket 113. Drive shaft 104 is also coupled by a belt and pulley arrangement 114 to an upper horizontal carrier roll drive shaft 116 which extends along the whole rear length of the machine and is carried for rotatable movement in suitable block bearings 118 bracketed to the rear of the machine. Through various gears and cross shafts connected with these drive shafts, continuous motion is communicated to the several driven parts of the machine.

A hand wheel 120 which is carried fast upon the end of drive shaft 104 permits the application of manual power to the drive shafts in lieu of electrical power when it is desired to make repairs or adjustments to the machine and a slow movement of various parts is desired.

The framework of the machine comprises front and rear frame sections 121 and 123 respectively supported by a proper number of legs (not shown). The shafts are carried in the framework and otherwise in a suitable manner well known in the art such as by bearings, brackets, journalling, etc.

CARD FEEDING SYSTEM

FIGS. 2–5

A suitable card feeding mechanism is provided in the machine. The card feed system is of the reciprocating type reciprocated by rotary means and is supported in the framing in the upper part of the machine. It comprises a cam wheel 122 mounted on drive shaft 104 in a suitable manner. Upon rotation of shaft 104 and consequent rotation of cam wheel 122, a reciprocal movement is communicated to a picker knife assembly which functions to pick a statistical card from card magazine assembly 50 and feed it to the sensing mechanism.

In the card feeding magazine assembly 50, a throat adjusting mechanism generally designated by the numeral 124, the magazine end plates 128, and the card supporting plate 130 are mounted upon a suitable bracket 132. The bracket 132 bridges the front and rear frame plates 121 and 123 and is rigidly supported at its ends upon block supports 133.

Secured to the front and rear undersides of magazine bracket 132 is a suitable slide plate bearing means including a pair of bearing plates 134 and a pair of flanged bearing blocks 136. A pair of slots 138 exist between bearing plates 134 and the flanged portion of the bearing blocks 136. These slots are adapted to support for reciprocal sliding movement therein a slide plate 140. On the right end of slide plate 140, there is suitably mounted a card picker means including a block 142 and a knife 144.

Carried on studs 146 on the underside of the picker knife slide plate 140 is a pair of rollers 148 positioned for rolling contact on either side with the side marginal faces 150 of cam wheel 122. The side faces 150 of cam wheel 122 are designed in such a manner that rotation of the cam wheel through the rollers 148 affects a reciprocating movement of slide plate 140 and block 142 upon which the picker knife 144 is mounted and whereby the picker knife in moving in a to and fro action picks the lowermost card from a stack of cards in the card magazine and carries it forward through the magazine throat adjusting mechanism 124 between the conveying rollers to the sensing system.

The cam curve of the side faces 150 of the cam wheel is such that with each cycle of the cam wheel, the picker knife 144 is reciprocated and one card is fed through suitable conveying rollers to the sensing unit.

CARD CONVEYING SYSTEM

FIGS. 1–5, 7

Suitable means is provided in the machine for conveying the cards picked from the card magazine to the sensing unit, and after analysis of the cards by the sensing unit, to their destined pockets. The card conveying system employed here comprises suitable sets of rollers, which are continuously driven while the machine is in operation through various gears and shafts which derive their rotation from the continuously rotating carrier roll drive shaft 116.

Operation of the picker knife assembly serves to advance each card picked to a first set of rollers comprising a pair of upper roller elements 152 in contact with a pair of lower roller elements 154.

The lower roller elements 154 are surfaced with a suitable gripping material such as rubber stock and are carried fast upon a lower cross shaft 158 which is suitably carried in the front and rear frame members of the machine.

The upper and lower roller elements are respectively mounted in juxtaposition upon cross shafts 156 and 158 the lower shaft 158 receiving its rotational actuation by a suitable gear 160 meshing with gear 162. The upper shaft is pivotably bracketed to the inner sides of frame members 121 and 123 and tensioned counter clockwise so that rollers 152 thereon are made to bear against rollers 154 on shaft 158. Such tensioning may be provided in a suitable manner by conventional tensioning means.

An index wheel 87 is mounted on one end of a shaft 164 the other end of which has mounted thereon a first pulley 166. Pulley 166 is operatively associated with a second pulley 168 by a belt 170. To the rear of pulley 166 and mounted fast on shaft 164 is a toothed wheel 167 utilized to fix the index wheel mounted on shaft 164 by means of rod 169. Pulley 168 is mounted on a short shaft 172 and rotatable thereon, shaft 172 being carried in brackets 174 and affixed to members which extend from the front to the rear of the machine. Affixed to belt 170 so that it is movable therewith is a sensing photocell block 176 containing a plurality of photosensitive cells and electrical contacts thereon for making contact with given sensing and decoding electric circuits as will be explained hereinbelow. Index wheel 87 is adapted to be turned by hand to move block 176 whereby the photosensitive cells are set to sense a particular column in the record card. Block 176 is adapted to slide along a shaft 178, a hold-down shoe 180 being mounted fast on shaft 178 and connected to block 176 by a spring 182. Thus block 176, as it is moved, is maintained under tensioning action by spring 182.

The first set of rollers serve to convey one picked card over a guide plate 184. The guide plate 184 has a multiplicity of holes therethrough which correspond to the positions where holes may be punched in the card being scanned and the bottom wall of block 176 has openings 186 therethrough in registration with the photosensitive cells. Exciter lamps 188 are provided which are mounted between the front and rear frames of the machine. Thus as the card passes between rollers 152 and 154 over guide plate 184 and with index wheel turned to position the photosensitive cells to scan a particular column, a light impulse will be received by the photosensitive cell from the light source at that point where the hole in guide plate 184, a punched hole in the record card, the hole in the bottom wall of block 176 and the photosensitive cell are in registration. This impulse is transmitted through an electrical contact on block 176 to complete the required electric circuit as explained hereinbelow.

Figure 3:
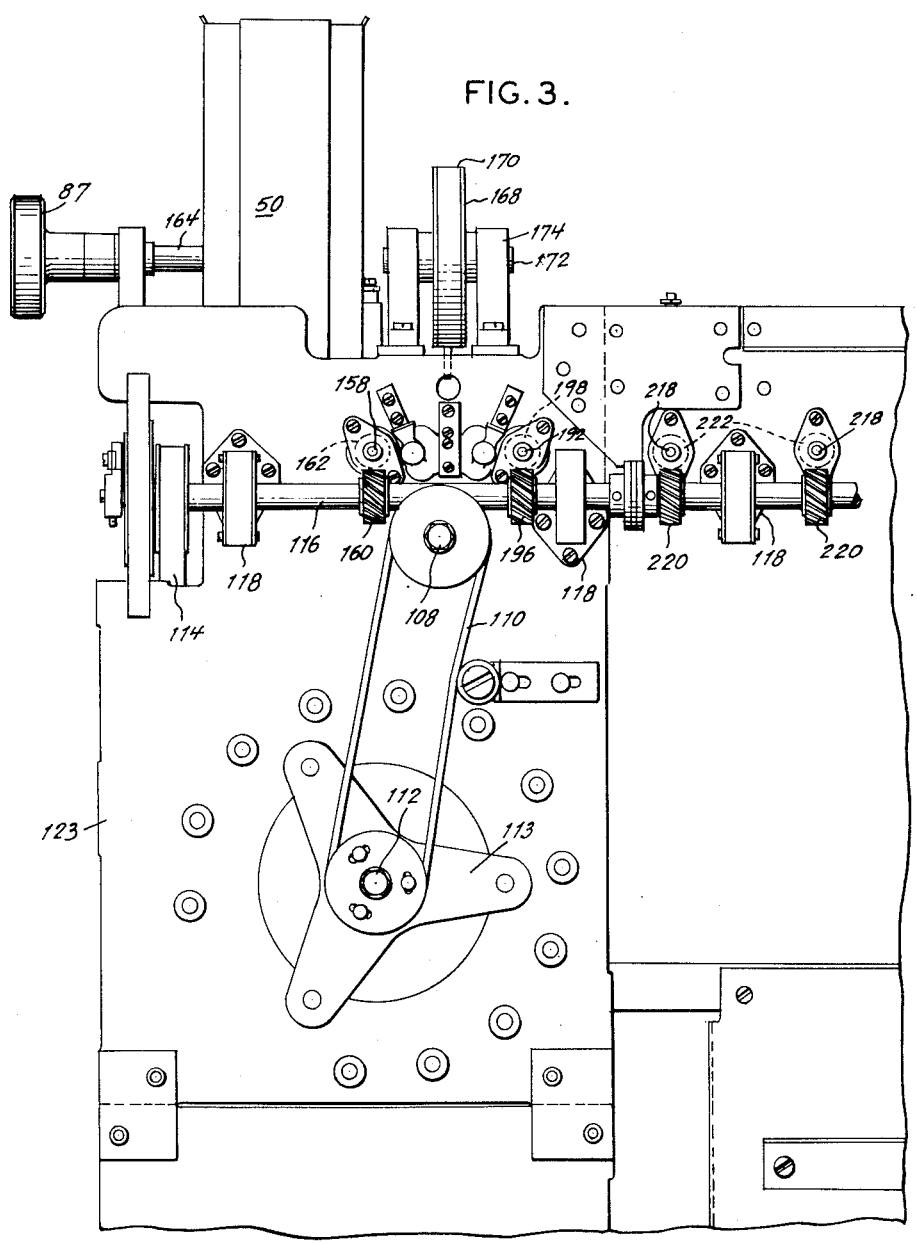
FIG. 3 is a fragmentary rear elevation showing the right portion of the machine.

The travelling card is now forced between a second set of upper rollers 189 and lower rollers 190 similar to the first roller arrangement and mounted respectively on an upper shaft 192 tensioned counter clockwise against a shaft 194. Shaft 194 derives its rotational movement from a suitable gear 196 meshing with gear 198 (FIG. 3) and the card is now moved along, destined for its proper pocket.

Each pocket is provided with a Y shaped finger like device 200 which functions as a gate. A corner of the tail of each finger 200 is mounted fast upon a pin 201 extending through the arm of a pocket actuator assembly comprising an armature, and an electromagnet. In a closed position, the surfaces of fingers 200 are in a position closing the pocket opening and presenting a level upper surface permitting a free and smooth movement of cards travelling over them. In open position, the right arm of the Y is inclined slightly upward whereby the moving cards pass under the free ends of the fingers and are carried to the pocket. Affixed to one end of each finger is a plate 202 which acts as a guide for an inclined and gradual carriage of the card into the pocket, thereby further facilitating the stacking of the cards.

Figure 8:
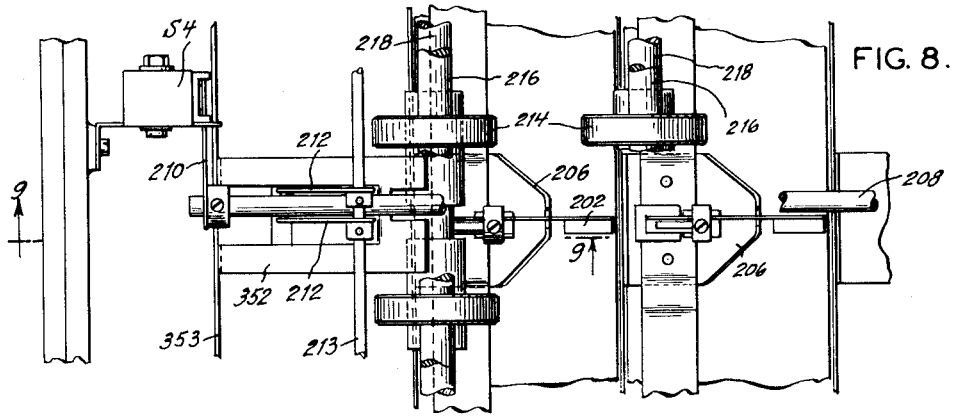
FIG. 8 is a plan view of a portion of the card conveying system of the invention.
Figure 9:
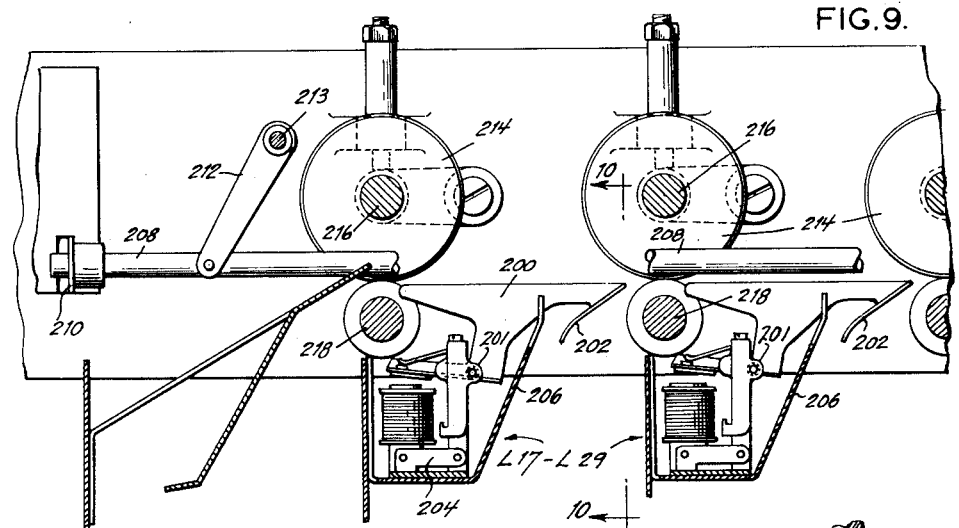
FIG. 9 is a view, partly in section, taken along line 9—9 of FIG. 8 looking in the direction of the arrows.
Figure 10:
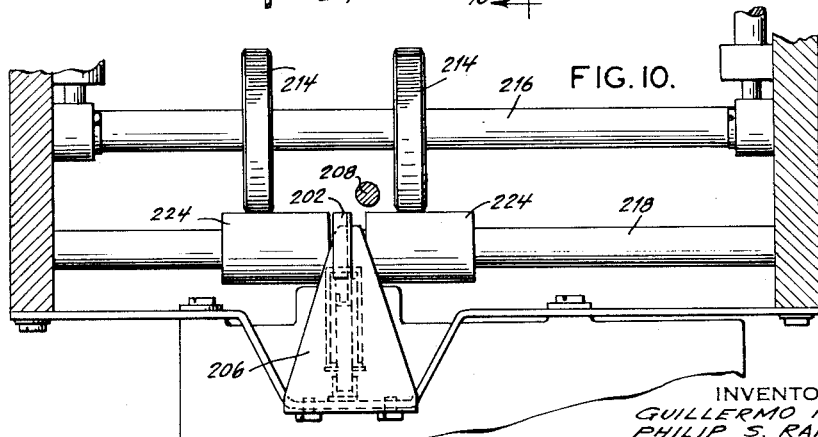
FIG. 10 is a view, partly in section, taken along line 10—10 of FIG. 9 looking in the direction of the arrows.

Fingers 200 are normally in a position closing their pockets and are raised to an open position through the action of electromagnets. There is a pocket actuator assembly associated with each pocket except the reject pocket shown in FIGS. 8 and 9, which is always open, the gate thereunto being mounted along the inner side of the framing. The pocket actuator assemblies comprise respective electromagnets L17–L29, see also FIGS. 35, 37, each magnet being provided with an armature assembly affixed to a bracket upon which finger 200 is mounted. The armature assembly and electromagnet are suitably mounted in a bracket 204. A bracket 296 is provided which has a slot therein that acts as a guide for the movement of finger 200. Energization of the magnet attracts the free end of the armature and pulls down the tail of finger 200 permitting entrance of cards into the pocket. Upon deenergization of the magnet, the guide plates 202 are released to normal position, when the armature assembly is tensioned away from the electromagnet. The pocket actuator assembly magnets are energized by the closing of electrical contacts through the action of timing disc magnets associated with a timing mechanism as will be further described below.

A card jam stop rod 208 extends from the left end of the machine to a point just to the left of upper and lower rollers 189 and 190 of the sensing section where it substantially tapers to a point. Rod 208 is provided for shutting off the power to the machine in the event that a moving card jams in its path to its destined pocket. It is suitably relatively loosely mounted at the left end of the machine in a conventional manner by a suitable bracket and has an arm 210 extending from its end adapted to trip a micro-switch S–4, when moved. Pairs of pivotable hanger arms 212, a pair located just about over each pocket are provided, each arm having one end pivotably mounted on a pin on rod 208 and its other end on a cross shaft 213 extending from the front to the rear frame. When a card buckles during its path of conveyance, it presses against rod 208 causing the latter to move in a lateral direction whereby switch S–4 is actuated and the power to the machine is shut off as will be further described.

The travelling card is next gripped by a third set of rollers comprising a pair of upper roller elements 214 mounted fast on an upper cross shaft 216. A lower cross shaft 218 derives its motion from a suitable gear 220 meshing with a gear 222 on roller drive shaft 116 and has mounted fast thereon lower roller elements 224 which are surfaced with a suitable gripping material, such as rubber stock. Lower cross shaft 218 is suitably supported by the front and rear frames and upper cross shaft 216 is tensioned counter clockwise thereagainst in a similar manner as described in connection with the shafts carrying the first and second sets of rollers. The third set of rollers is the set traversed by the card to approach the first pocket. As the card moves along it is gripped by successive sets of roller elements similar to the third set and if a gate is not opened to receive it in any of the first thirteen pockets, it proceeds to the fourteenth or reject pocket.

THE TIMING MECHANISM

FIGS. 5, 6, 8–14

Suitable timing mechanism is provided in the machine. The timing mechanism includes a plurality of timing disc actuators comprising electromagnets L4–L16, see also FIGS. 35, 37, each responsive to a circuit elicited by a decoding unit from one or more circuits created by closing of the sensing contacts in photo cell block 176. The decoding unit described herein below analyzes or translates the circuits created with the sensing of each card and elicits a single circuit. The elicited circuit energizes one of the timing disc actuators to cause the closing of one of a series of electrical contacts. This action results in the energization of corresponding pocket actuators and the consequent opening of an associated card pocket in time to receive the sensed card.

A plurality of timing disc members 250, thirteen in all, comprising actuating means for the associated pockets, each representative of a particular card pocket, are axially mounted fast in proper lateral spaced relation to one another upon timing disc shaft 112 and are adapted to be carried about with the rotation of this shaft. Shaft 112, as described hereinabove, derives its motion through belt and pulley means 110 which connects it to intermediate shaft 108, shaft 108 deriving its motion from main horizontal drive shaft 104 through gears 106. Shaft 112 is continuously in motion during the operation of the machine and the gear ratios of gears 106 are such that the timing disc member will make one revolution to twelve of cam wheel 122.

There is provided a series of timing disc actuators L4–L16, thirteen in all, each related to a particular card pocket. The magnets of these actuators are mounted to a fixed member 252 in a horizontal linear spaced array extending from the front to the rear of the machine. Each magnet is provided with an armature, best seen in FIGURE 11, which in normal position is tensioned slightly away from its associated magnet by a spring 254 suitably connected thereto as shown. Pivotably associated with each armature is a timing disc armature extension 256, each timing disc member 250 being associated with a corresponding extension arm.

The timing discs are provided with an annular series of trip pawls 258 and associated restrict trip latches 260. The arrangement is such that actuation of a timing disc actuator serves to set-up one of the trip pawls. As will be described hereinbelow, this set-up trip pawl is carried about by its timing disc member and causes the closing of a related electrical contact and consequent energization of a pocket actuator to effect the opening of an associated pocket in time to receive an approaching card. The latches and pawls in coperation with suitable camming means are then subsequently reset to normal position.

The annular series of trip pawls 258 are carried for pivotal movement on the front side of each timing disc member 250. Here, they are spaced equally apart on one side of the disc, and are preferably twelve in number, that being a number giving superior results. The pawls 258 are of substantially triangular configuration and each pivots at its apex upon one of an annular series of studs 266 which extend out from both sides of the disc plate. Projecting rearward from one angle of each pawl is a pin 272. Each pin 272 plays in and projects through an enlarged hole 273. Projecting laterally from the third angle of the pawl is a trip pin 262 adapted for tripping linkage that will effect the closing of a related electrical contact. Normally, pawls 258 are held in a position whereby the projecting trip pins 262 are unable to effect the closing of their related electrical contacts. They are held latched in this disabled position through the action of a series of retract latches 260 and springs 264. Each latch 260, there being one associated with each pawl, pivots on the extended rear end of a pawl pivot stud 266. Each latch controls the position of the pawl immediately behind the pawl to which it is pivoted. A tail 268 of each latch 260 has a step 270 in which is contained the pin 272 of the pawl it controls. The spring 264 hooked at one end to pawl pin 272 and at the other end to a latch pin 274 of the associated latch, serves to draw the pawl pin into step 270 of the latch and to thereby restrain the pawl in a counter clockwise ineffective position. Each latch is provided with an elevated extension 276. A pawl is releasable to effective tripping position whenever the extension 276 of its associated latch comes into collision with an armature extension arm 256.

The arrangement, as shown in FIG. 11, is such that upon the sensing of a perforated card, an impulse is transmitted to momentarily energize a magnet L4–L16 of a timing disc actuator. The magnet attracts its armature against the tension of its spring 254 and effects the momentary lateral leftward movement of its associated extension arm 256 into the path of the first elevated latch extension 276 it encounters from an associated timing disc member 250. The extension arm 256 hits against the extension 276 forcing it to move clockwise whereby the latch tail 268 is drawn away from its related pawl pin 272 and the related pawl 258 is at the same time spring drawn clockwise to move its pin 262 downwards to effective tripping position. The affected pawl is limited in its clockwise movement by its pin 272 limiting against the side of enlarged hole 273. The action of armature extension arm 256 is temporary; it slides off the latch extension 276 and is retracted back to normal position upon the deenergization of its associated magnet and before it can collide with the next on-coming latch extension 276.

The actuated pawl 258 is then carried around with the counter clockwise rotation of its timing disc member 250 until it strikes the end of an associated wiper lever 278. Each wiper lever 278 is carried fast on a cross shaft 280 which is suitably carried for pivotal movement at its ends. Associated with each lever 278 on the corresponding shaft 280 is a contact operating arm 279 which is also mounted fast on the shaft. When the actuated pawl 258 hits lever 278, shaft 280 is forced to pivot causing contact operating arm 279 to move so that its nose strikes a contact assembly 282, see FIGS. 11, 12, to effect the closing of contacts S21 to S33 associated with magnets L17-L29, see FIG. 9, and actuation of the pocket actuator assembly to cause the opening of card pocket associated with the particular timing disc. The distance a pawl is carried from the time it is set up to the time it effects the closing of its related electrical contact determines the distance a card must travel to approach its destined pocket.

Figure 5:
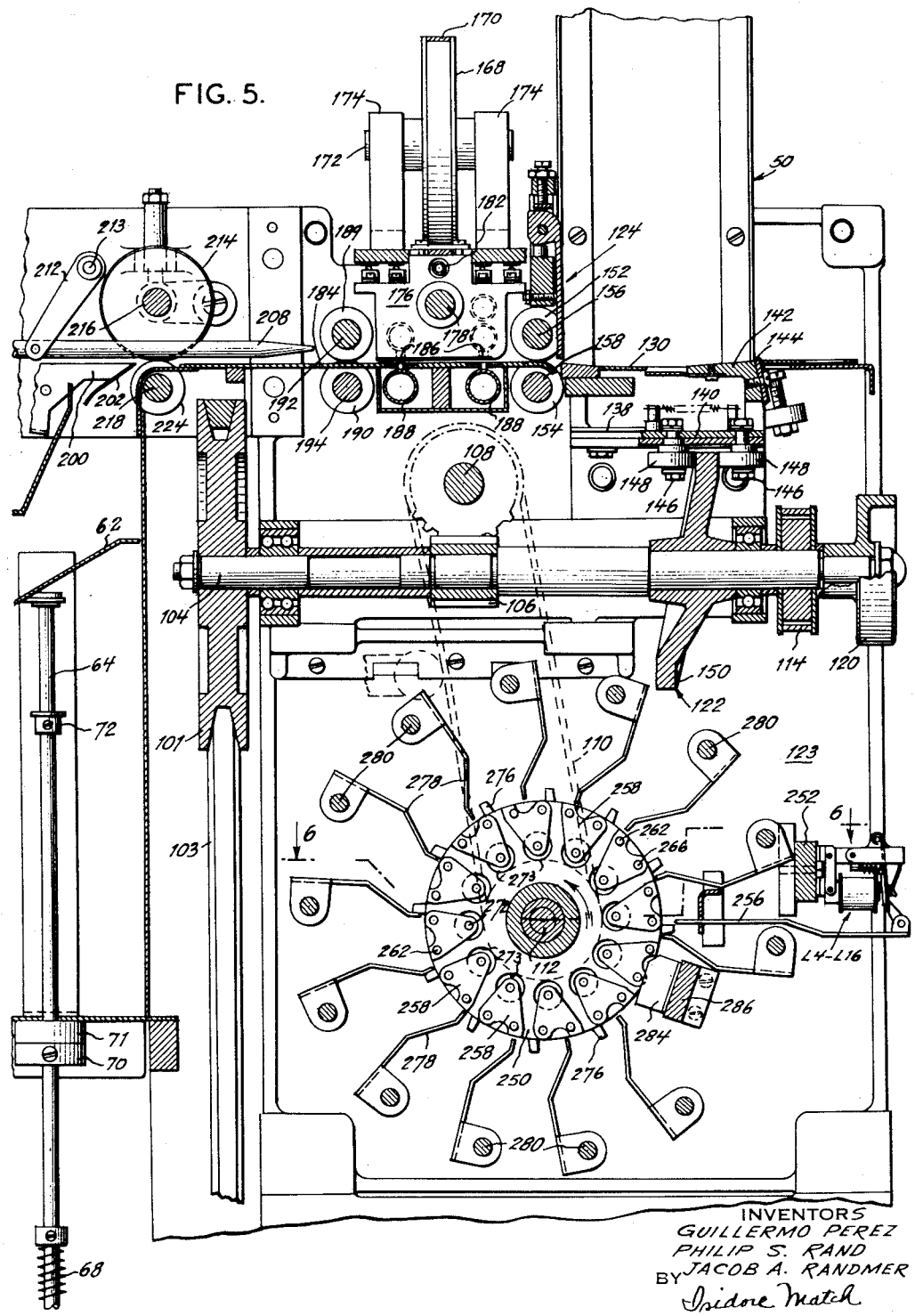
FIG. 5 is a view, partly in section, taken along line 5—5 of FIG. 4 looking in the direction of the arrows.
Figure 6:
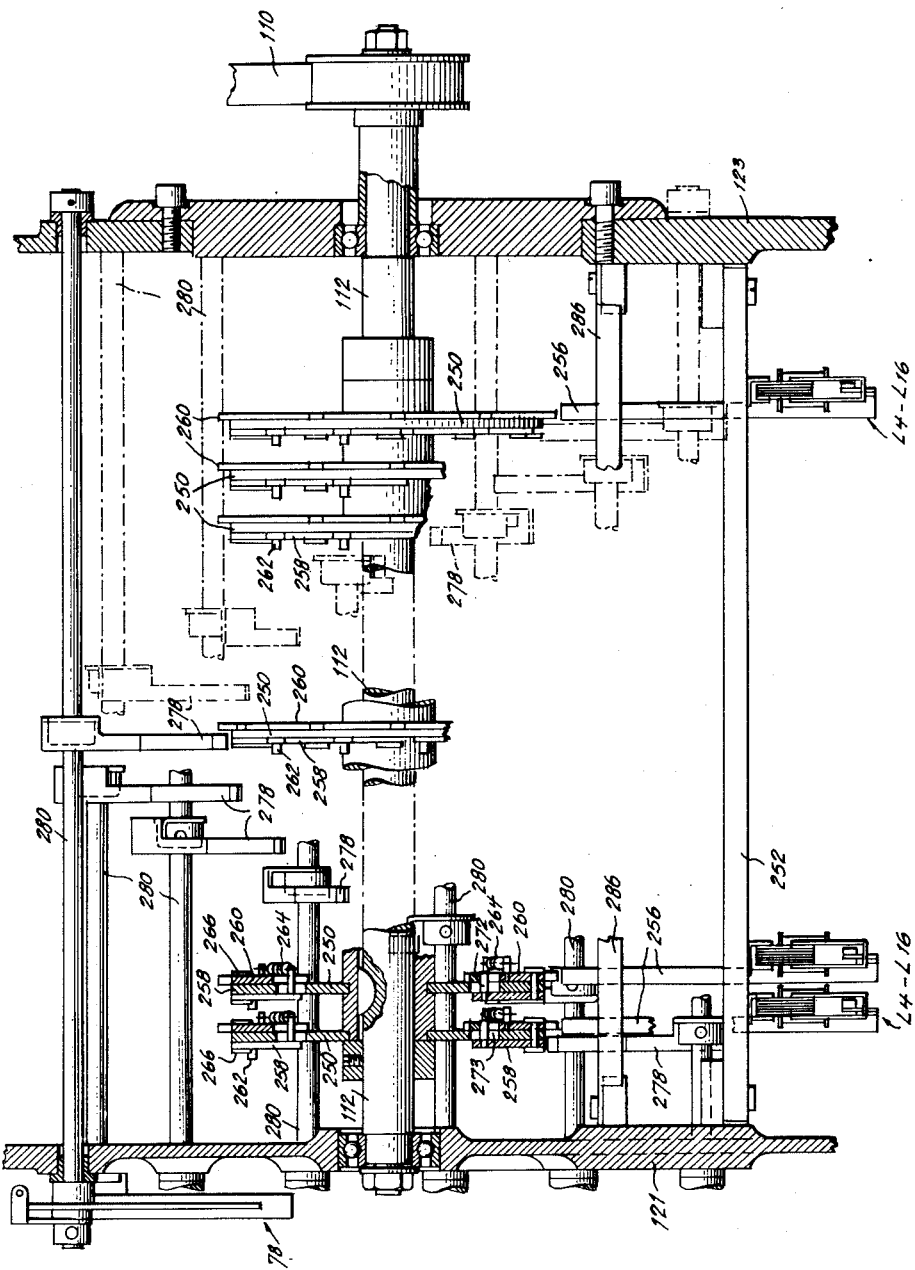
FIG. 6 is a view, partly in section, taken along line 6—6 of FIG. 5 looking in the direction of the arrows.

It is seen from FIG. 5 that the pivotable cross shafts 280 are arranged in a circular array, each having mounted thereon a wiper lever 278. Associated with each timing disc 250 in the same plane is a timing disc actuator L4-L16.

The arrangement of the timing disc pawls 258 and armature extension arms 256 is such that arm 256 is located to set up a pawl on a related timing disc member 250 at a set number of degrees away from the point of contact of the set up pawl with its related wiper lever 278. The number of degrees the set up pawl is carried, before it contacts lever 278 corresponds to the distance the sensed card travels from the time the corresponding timing disc armature extension arm 256 is actuated to a point approximately .125 inch distant from the mouth of its related pocket. From the time lever 278 is contacted and a pocket actuator is energized to open its related pocket, the card travels the .125 inch.

Each statistical card is 3.25 inches in width. This also is the distance between corresponding points of adjacent card pockets. With each revolution of the cam wheel 122 or each 1/12 or 30° revolution of the timing disc shaft, i.e. shaft 112, a card is conveyed 3.75 inches in the initial cycle by the card picker 144 and thereafter 3.25 inches in succeeding cycles by the various feed rolls to thereby establish a gap of .50 inch between successive cards feeding through the machine.

In all cases regardless of which pockets is to be affected, a sensed card will have to be carried to a point .625 inch from the right side of pocket 1 when a pawl on any of the timing discs is set up by the armature extension arm of its related timing disc actuator. Hence, in the case of a card destined for the pocket 1, the set up pawl must travel a distance of 4° before contacting wiper lever 278. A travel of the pawl of 4° corresponds to .50 inch travel of the card. The card travels another .125 inch before the pocket actually opens.

To cover the additional 3.25 inches that a card must travel to reach the number two pocket, a pawl related to this pocket must travel an additional 26°, and so on with each successive pocket 26° is added to the travelling distance of the affected pawl.

To affect this relation of the timing disc pawls and contact operating arms 279, each wiper lever 278 is of equal length and each cross shaft 280 is spaced from its neighbor 26° with a distance of 48° between the first and thirteenth shafts. Each timing disc member 250 associated with each contact operating arm 279 is adjusted in position so that when its armature extension arm 256 is affected, a pawl will be set up the required number of degrees it must travel to actuate its related contact operating arm.

There are a series of leaf contacts S21–S33 carried in a suitable insulating block, one series associated with each contact operating arm 279.

The arrangement is such that upon an actuated pawl coming in contact with an associated wiper lever 278, the latter causes the shaft 280 on which it is mounted to turn causing the associated contact operating arm 279 to turn correspondingly so that its end moves against leaf contacts 282 to effect closing of related electrical contacts and the consequent energization of a related pocket actuator. With this movement of shaft 280, pawl 258 readily forces its way past the end of wiper lever 278. The pawl is further carried around with the revolving timing disc member 250 and is then reset to normal position through the action of U shaped camming member 284.

There are a series of camming members 284, each associated with two adjacent timing disc members 250, all mounted on a bar 286 extending from the front to the rear of the machine in a spaced linear array.

The nature of each camming member is such that as an actuated pawl is carried about with its timing disc member 250 and after it rides past the end of wiper lever 278, the pin 262 thereon contacts and passes over the cam surface of its associated cam plate 284 whereby the pawl 258 is forced inward. This action pivots the pawl counter clockwise and forces its pin 272 against the tension of its spring 264 away from latch 260, whereupon tension of the spring 264 moves the tail 268 of the latch so as to latch the pawl pin 272 in its ineffective or normal position in the tail step 270.

THE CONTROL PANEL

FIGS. 1, 2, 4, 7, 15

Figure 7:
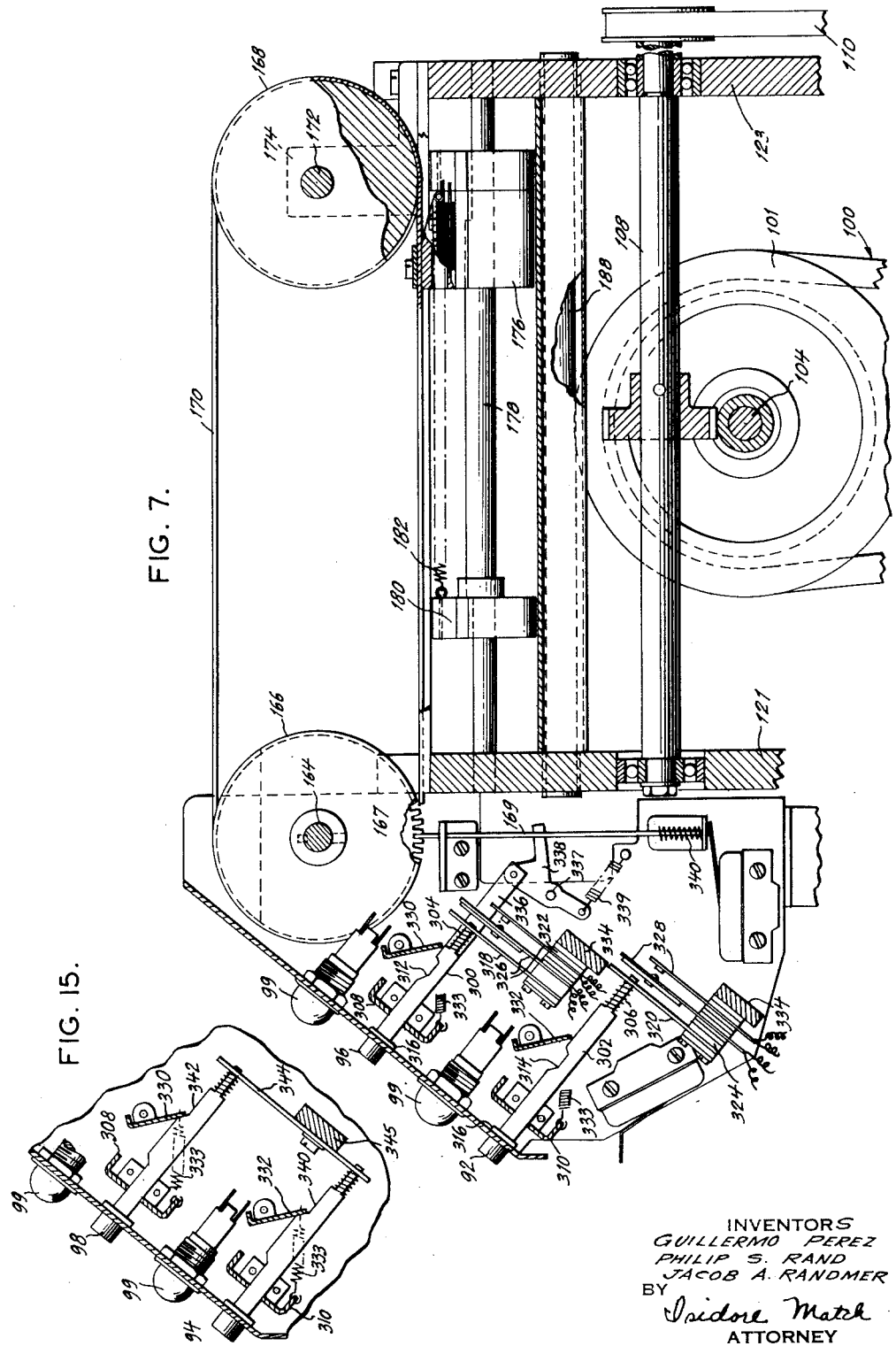
FIG. 7 is a view, partly in section, taken along line 7—7 of FIG. 4 looking in the direction of the arrows.

Since FIG. 7 is a view taken on line 7—7 of FIG. 4, there are shown keys 96 and 92 and their indicator lights, 99. Keys 96 and 92 comprise rods 300 and 302 respectively, loaded by springs 304 and 306, the rods extending through holes in U shaped brackets 308 and 310 affixed to the frame. Each rod has a notched portion therein, 312 and 314 respectively. A stop 316 is provided on each rod to abut against the frame of the control panel. When the keys are in the unpressed position, the ends of rods 300 and 302 extend through holes in guide leaves 318 and 320 contained in insulating blocks 322 and 324 together with contact leaves 326 and 328 respectively. Respective L shaped brackets 330 and 332 pivotably mounted on studs have the ends of their vertical legs connected to the end of one arm of brackets 308 and 310 respectively by springs 333, and the blocks 322 and 324 are mounted firmly on suitably fixed members 334.

When key 96 is pressed down, the vertical leg of bracket 330 rides into notched portion 312 to keep rod 300 in a depressed position and leaves 326 are closed to complete a circuit for conditioning the machine for upper half card column sorting, its associated indicator light simultaneously lighting up. When key 92 is depressed, the vertical leg of bracket 332 rides into notched portion 314 and maintains rod 302 in a depressed condition while leaves 328 are closed to complete a circuit for conditioning the machine for sorting a selection from the first half of the alphabet, indicator light simultaneously lighting up.

The rod 336 for the index wheel key 95 has its inner end connected to one end of a member 338 pivotally mounted on a stud 337, the other end of member 338 being connected by a spring 339 affixed to a stud on the frame. A fingerlike extension from member 338 is received in a notch in rod 169 which has one end loaded by spring 340 and its other end received between two teeth of quadrant wheel 167. When index key 95 is depressed, member 338 is caused to pivot causing rod 169 to be lowered and freed from toothed wheel 167 consequently releasing the index wheel so that it may be turned. Simultaneously with the freeing of wheel 167, an index switch is actuated shutting off the power during this time.

Leaves 328 have two sets of leads, one set for conditioning the machine to sort A–M, the other for lighting a proper indicator lamp. Leaves 326 have two sets of leads, one for switching to the upper field photocell, the other for lighting a proper indicator lamp.

In FIG. 15, there are shown the clearing buttons 98 and 94. Each button comprises a spring loaded rod having notched portions 342 and 340 respectively wherein the long arms of L shaped brackets 330 and 332 are received. The spring loaded ends of the rods are guided through holes in member 344 mounted on a fixed bracket 345. The clear buttons 98 and 94 serve mechanically to clear buttons 96 and 97 or 91, 92 and 93 by freeing the L shaped brackets from the notched portions of the button rods.

RECORD CARDS

As previously stated the effect of closing the electrical contacts associated with a timing disc member is to energize a related pocket actuator and to effect the opening of a pocket for reception of the sensed card.

The particular timing disc plate to be actuated and the particular pocket to be opened is primarily determined by the particular index points perforated in the statistical card passing through the machine. Suitable decoding means, hereinafter described, is provided to select a single electrical circuit from the one or more circuits initiated in the sensing of a card and to transmit that circuit to the proper timing disc member, which member in turn, will at the proper time bring about the opening of the proper card pocket.

The machine is designed to sort the type of statistical cards used with tabulating and accounting machines. It is particularly adapted for use with a conventional 90 column card employing the well known six point alphanumerical combination code and having an upper and a lower field UF, LF.

As stated above, switches controlled by keys 96 and 97 are provided whereby the operator may select either the upper or lower card field for sensing and sorting of a batch of cards. Where a card contains perforations in both fields, only those perforations in the field selected are effectively sensed. On the next sorting run of the machine the card may be sensed for those perforations in the other field. A card not containing any perforations, or not having perforations in the selected field, is not sensed and is carried off to the reject pocket to await further sorting operations.

In FIGS. 16–22 there is shown the device for changing or adjusting the spring tension on all of the card receiving platforms simultaneously through a single dial control.

Each card pocket 350 defined by separator plates 353 contains therein a card receiving platform 352 inclined downwardly and to the left. Each card receiving platform 352 is mounted upon the upper end of a vertically disposed shaft or rod 354 which rod is normally held in an elevated position by a spring 356 which encircles the rod. The lower end of spring 356 seats upon channel member 358 of the sorter and the upper end of spring 356 seats against a first collar 360 mounted fast on rod 354. A second collar 362 mounted fast on rod 354 and spaced from collar 360 cooperates with four shouldered collars 364 slidable on shafts 366 as will be presently described.

Figure 16:
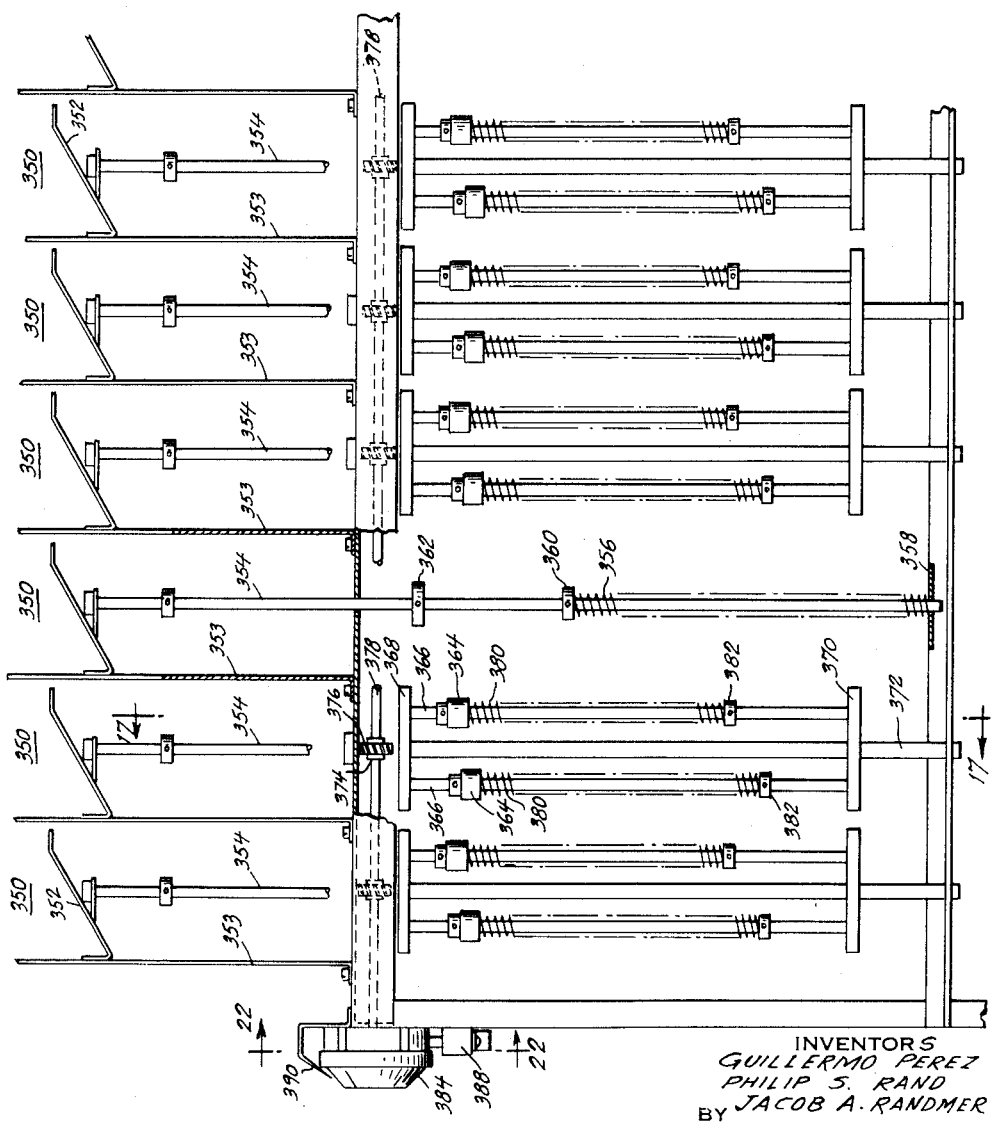
FIG. 16 is a fragmentary front elevation of a sorter showing six of the card pockets, with the card receiving platforms equipped with an improved spring tension device.
Figure 23:
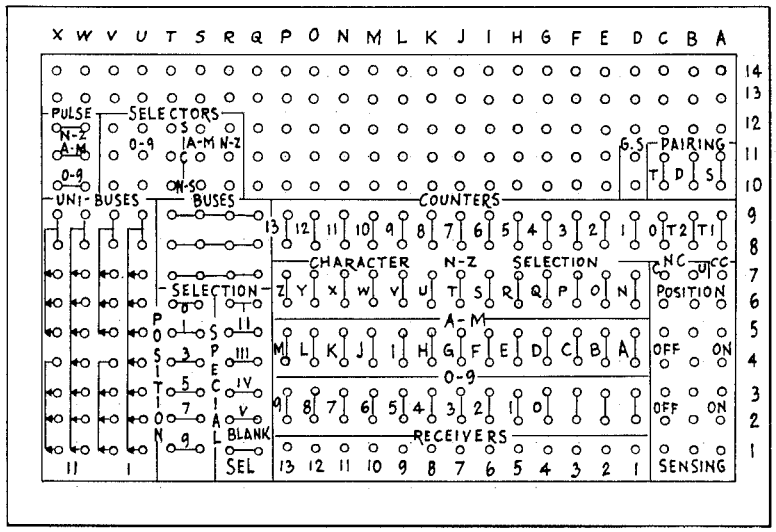
FIG. 23 is a view of the connection panel.

The four shafts 366 are supported in spaced relation relative to one another by a pair of discs 368 and 370 and the discs are mounted upon a shaft 372 journalled for rotation so as to carry one of the collars 364 into engagement with collar 362 on the adjacent rod 354. The upper end of each shaft 372 is provided with a worm wheel 374 which meshes with a worm 376 fast upon a dial shaft 378. Springs 380, of different strengths, encircle shafts 366 and are confined between the shouldered collars 364 and collars 382. A knurled hand knob on dial 384, fast on one end of dial shaft 378, is provided with indicia 386 and detent means 388 as is shown in FIGS. 16, 21 and 22.

It is seen that the spring tension upon the card receiving platforms 352 may be selectively changed at will by merely rotating hand knob 384 with respect to an indicator finger 390. When hand knob 384 is set at the number 1 position, the only tension upon the card receiving platform 352 is through the spring 356 encircling the rod 354 which is the set position for the shortest or lightest card fed into the machine. When knob 384 is set at the number 2 position, one of the shouldered collars 364 will be brought into position beneath collar 362 so that spring tension upon the card receiving platform will be the combined tension of spring 356 and spring 380, as shown in FIG. 18. Thus, as dial 384 is rotated from the number 1 position to positions 2, 3, 4, and 5, spring tension upon card receiving platform 352 is progressively increased due to the fact that the four springs 380 are of progressively greater strength. It is thus seen that the spring tension upon the card receiving platform 352 may be selectively and progressively increased or decreased depending upon the size of the cards being sorted and deposited into the pockets 350.

THE CONNECTION PANEL

FIG. 23

The connection panel provides the means of establishing the card column positions to be sensed, the alphabetical and numerical codes and card column positions to be selected, and the card receivers to which the cards are to be directed. A cover which is opened to gain access to the panel coincident with the turning on of the power switch causes an automatic switch to be energized which shuts off the direct current utilized in the sensing operation. Cards can still be fed but they will not be sensed and received in the proper card pockets.

When the cover is closed, the direct current will again be supplied. The connection panel is primarily housed in the machine and contains sockets into which connection wires are plugged to establish the sensing, selecting, and receiving connections desired for the type of sorting operation to be performed. A row of alphabetical characters reading from A–X are provided along the upper border of the panel and a vertical row of numerals from 1–14 is provided along the right border of the panel, the numbers increasing in an upward direction. These border rows of letters and numbers are those indicated in the parentheses in the further description of the connection panel which follows.

The wiring in the section of the panel labeled "Position Sensing" determines which of the six (0, 1, 3, 5, 7, and 9) card column positions are to be active for sensing. There are six horizontal rows in this section comprising three sockets each, one row for each of the six card column positions. The sockets in the vertical row B emit the impulses obtained by the sensing of the related punched position. The "On" sockets in the vertical row A receive the sensing impulses when the related position is to be active for sensing. The "Off" sockets in the vertical row C receive the sensing impulses when the related position is to be active for sensing.

The "Character Selection" (D–P, 2–7) section determines which of the thirty-six numerical and alphabetical codes will be selected provided, of course, that the positions comprising the code or codes desired to be selected are wired for sensing. Ten pairs of sockets within the D–P, 2–3 area emit the impulses for the selection of the numerals from 0–9, reading from right to left. The numeric character being sorted which is related to each pair of sockets is printed on the panel just to the left of the vertical line joining the two.

The "Character Selection" (A–M, D–P, 4 and 5) includes thirteen pairs of sockets within this area which emit the impulses for the selection of the first half of the alphabet from A–M reading from right to left. The alphabetical character related to each pair of sockets is printed on the panel just to the left of the vertical line joining the two.

The thirteen pairs of sockets within the area described by (D–P, 6 and 7) emit the impulses for the selection of the second half of the alphabet from N–Z, reading from right to left. The alphabetical character related to each pair of sockets is printed on the panel just to the left of the vertical line joining the two. The sockets in the individual sub sections 0–9, A–M and N–Z are active only if the related code selection key or keys are depressed. The wiring from the character selection sockets is to the desired sockets in the "Receivers" section.

The thirteen controlled card receivers are represented by the sockets in the horizontal row below the word "Receivers" on the panel. There is one socket for each of the receivers. An impulse delivered to one of the sockets from one or more selection socket ("Character," "Blank," "Position," "Pulse," or "Special") will cause the related card gate to open to receive the card being sensed at the time the impulse was delivered. Wiring to a receiver socket is from one or more selection sockets according to the position or positions, code or cards to be sorted into that card receiver.

An impulse will be emitted from the pair of sockets in the Blank SEL section on the panel when "Position Sensing" does not deliver an impulse to the machine. The emission of a "Blank" impulse may be caused by an unpunched card column, or a card column punched in positions other than those wired "On" in the "Position Sensing" section. The sockets will also emit regardless of the setting of the code selection keys. The "Blank" may be wired to the receiver socket of any one of the card receivers so that "Blank" cards are sorted into one of the card pockets rather than being fed to the reject card pocket.

In the "Position Selection" section described by the boundary (S and T, 1–6), the sockets therein are directly related to the "Position Sensing" sockets to emit an impulse by card column position regardless of code. An impulse is emitted from a "Position Selection" socket when that position is sensed regardless of the setting of the code selection keys. When a multiple number of positions are sensed from one card column, the related "Position Selection" sockets will emit simultaneously. Of course, these sockets must be wired for sensing. There are six sets of two common sockets each. Each set is related to one of the six positions, i.e., 0, 1, 3, 5, 7, and 9. The wiring from the sockets is to the desired sockets in the "Receivers" section.

The sockets in the "Special Selection" section limited by the boundaries (Q and R, 2–6) emit impulses for special character codes. These codes are other than the standard 0–9, and A–Z. They may be such combinations as 0—1, 0—1—3, 0—1—5, 0—1—7, 0—1—9, etc. There are five sets of two common sockets in this section. Each set is identified with a Roman numeral; I, II, III, IV and V. The "Special Selection" sockets will emit upon the sensing of the related special character code regardless of the code selection keys. The wiring from the "Special Selection" sockets is to the desired sockets in the "Receivers" section.

The three sets of two sockets each in the "Pulse" section which are limited by the area bounded by (W and X, 10–12) are related to "Character Selection" and to the code selections keys on the control panel. When the 0–9 code selection key is up, an impulse will be emitted from the sockets (W and X, 10), on each numerical selection. When the A–M code selection key is up, an impulse will be emitted from the sockets (W and X, 11), each time a selection is made for the first half of the alphabet. When the N–Z code selection key is up, an impulse will be emitted from the sockets (W and X, 12), each time a selection is made for the second half of the alphabet. When a code selection key is depressed related pulse sockets will not emit.

The sockets in the "Selectors" section described by the boundaries (R–V, 10–12) represent three selectors; one 3-column selector and two single-column selectors. The code selection keys provide the control of the operation of the selectors. The 3-column selector included in (T–V, 10–12) is related to the 0–9 code selection key. When this key is up the selector will assume the "non-select" position. When this key is down, the selector will assume the "select" position. The single-column selector included in the area described by (S, 10–12) is related to the A–M code selection key. When the latter key is up, the selector will assume the "non-select" position. When the key is down, the selector will assume the "select" position. The single-column selector described by (R, 10–12) is related to the N–Z code selection key. When this key is up, the selector will assume the "non-select" position. When this key is down, the selector will assume the "select" position. The three selectors are designated "0–9," "A–M," and "N–Z" only for the reason that respective code selection keys are used to control the individual selectors. Any sensing, selection or control impulse or combination impulses may be routed to any desired selector. The sockets in the horizontal row (10) are the "non-select" sockets of the individual selectors. The sockets in the horizontal row (11) are the "common" sockets for the individual selectors and the sockets in the horizontal row (12) are the "select" sockets for the individual selectors.

To select one of two sensing, selection, or control impulses, one of them is wired to the S (select) socket and the other is wired to the NS (non-select) socket. The wiring out of the selector is from the C (common) socket. When the related code selection key is set down, the sensing selection or control impulse wired to the S socket will be emitted from C socket. If it is desired to send one sensing, selection, or controlled impulse in either of two directions, the sensing, selection, or control impulse is wired to the C socket. The impulse wiring is out of the S socket in one direction, and out of the NS socket in the other direction. When the related code selection key is set down, the sensing, selection, or controlled impulse will be emitted from the S socket. When the related code selection key is up, the sensing, selection, or controlled impulse will be emitted from the NS socket. Of course, a sensing, selection, or of control impulse wired to a C socket may be wired out of that selector on only the "select" side or on only the "non-select" side. In the first case, the impulse will only be delivered while the code selection key for that selector is set down whereas in the latter case, the impulse will only be delivered while the related code selection key is up.

In the "Buses" section described by the boundaries (Q–T, 7–9), there are three horizontal rows of four sockets each. The sockets in each horizontal row in this section are permanently connected at the rear of the connection panel. They will, therefore, serve equally for a common purpose. The "Buses" are provided to supplement the basic sockets already outlined to get added capacity for connections whenever they are required. They are not directly related to any of the basic sockets. A bus row is made to relate to a basic socket, however, by wiring from that basic socket to any one of the sockets in that bus row. The other sockets in that row will then serve the same purpose as the basic socket. If more sockets are required for the same purpose, two or more bus rows may be interconnected by wiring from one socket to a socket in a second bus row.

In the "Uni-Buses", I and II described by the boundaries (U–X, 1–9) six uni-buses are provided as follows.

A seven socket entry (U, 1–7) with an exit of two common sockets (U, 8 and 9), a three socket entry (V, 1–3) with a single socket exit (V, 4), a three socket entry (V, 5–7) with an exit of two common sockets (V, 8 and 9), a seven socket entry (W, 1–7) with an exit of two common sockets, (W, 8 and 9), a three socket entry (X, 1–3) with a single socket exit (X, 4), and a three socket entry (X, 5–7) with an exit of two common sockets (X, 8 and 9). Electrical current can travel in but one direction in a "Unitary-Bus", i.e., into an entry socket and out a related socket. An impulse entered into one of the entry sockets will not emerge from any of the other entry sockets. The "Uni-Buses" are provided to supplement the basic sockets to give added capacity for connection whenever so required. They are not directly related to any of the basic sockets. A "Uni-Bus" is made to relate to a basic socket by wiring the exit socket of that "Uni-Bus" to the basic socket. Connections from other basic sockets that initiate the desired exit impulse are wired to the entry sockets of that "Uni-Bus". If direct connections are likely to result in the electrical current flow in the wrong direction (such as feed-back), the connection is made through a "Uni-Bus".

The wiring to "Counters" section described by the boundaries (A–P, 8 and 9) from any of the "Selection" sockets, "Character Selection", "Blank" or "Selection", "Position Selection", "Special Selection", "Pulse" or from the "Card Count" or "Nullified Count" impulse sockets determines what counters are to be active and the tally to be obtained from the respective counters. There are sixteen sets of two common input sockets each within this section. Each set of sockets is directly related to the counter in the counting unit bearing the same symbol. The symbol of the counter related to each pair of sockets is printed on the panel just to the left of the vertical line joining the two. From right to left, these symbols are T1, T2 and 0–13.

The socket in the "Card Count" (CC) section described by the boundary (A, 7) emits an impulse each time a card passes through a sensing section. The wiring from this socket may be to any of the sockets in the "Counters" section. It is generally wired to T1 or T2 or both T1 and T2 to obtain a total count of cards by group or for the entire run.

The C socket in the "Nullified Count" (NC) section described by the boundaries (B and C, 7) emits an impulse each time a card passes through the sensing section except when a selection impulse is delivered to the U socket. Thus, the card count is nullified by the selection count to give the nullified count. The wiring of the C socket is generally to the 0 counter socket. The selections wired to counters are also wired to entry sockets of the uni-buses. The exit sockets of the uni-buses are wired to the U socket.

In the FIGS. 1–26, there have been shown in several places, the physical components comprising electrical circuits such as timing discs and pocket actuators, electrical contacts, switches, etc. The physical wiring has been omitted from these figures for convenience in depiction but it is to be understood that when the description sets forth the completion of an electrical circuit between two or more physical structures, the electrical wiring is of course included although not shown in the figures.

Figure 24:
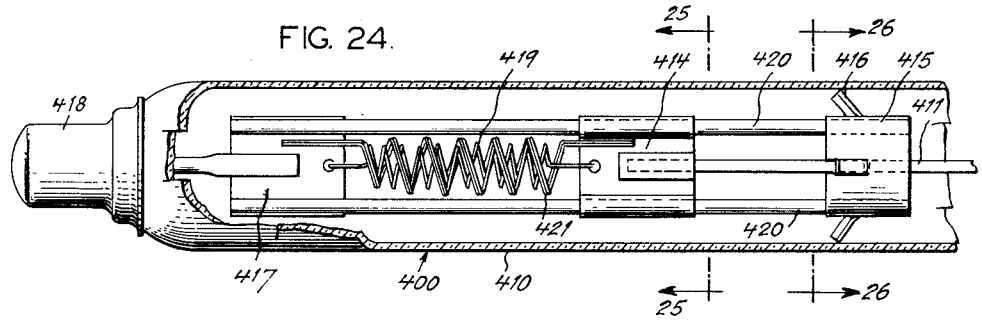
FIG. 24 is a fragmentary side elevation of an improved sensing lamp partly cut away to show the elements contained therein.
Figure 25:
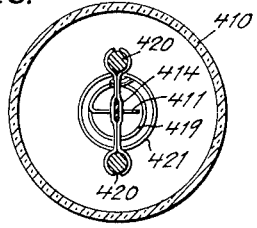
FIG. 25 is a section taken along line 25—25 of FIG. 24 looking in the direction of the arrows.
Figure 26:
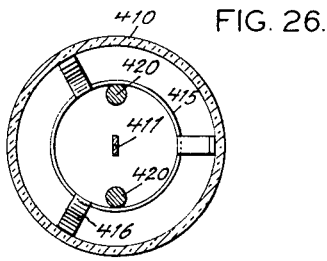
FIG. 26 is a section taken along line 26—26 of FIG. 24 looking in the direction of the arrows.

FIGS. 24, 25 and 26 illustrate an improved lamp having a long ribbon filament. Normally, in lamps of this type, the filament sags as it is heated due to expansion. The means usually employed for overcoming such sag is to provide a take-up spring which is adapted to maintain the filament taut at all times. However, if the assembly is not supported at the point at which the filament is joined to the take-up spring, the assembly vibrates readily, especially if the lamp is used in equipment subject to vibrations such as the sorting machine of the present invention. The device disclosed in FIGS. 24–26 overcomes this vibration.

In FIGS. 24–26, the lamp 400 comprising an evacuated envelope 410 has a ribbon filament 411 contained therein secured at one end to the terminal of the lamp (not shown) and at the other end to a plate 414. Plate 414 is slidably mounted on a frame comprising a ring 415 having lugs 416 thereon for positioning the ring in envelope 410. The remainder of the frame comprises a flat plate 417 secured to the other end terminal 418 of lamp 400 and is connected to ring 415 by two wires or rods 420 on which plate 414 is slidably mounted. Plates 414 and 417 are connected by a tungsten spring 419 and a coil of copper wire 421 which forms the electrical connection between filament 411 and end terminal 418.

As current is passed through filament 411, it expands and the spring 419 causes plate 414 together with ribbon 411 to slide along guide rods 420 thus taking up a slack in the filament. Plate 414 supports filament 411 at the point where it and the spring 419 are joined together and thus there is effected an elimination or at least a considerable minimization of filament vibration. In addition, plate 414 prevents filament 411 from rotating so that the plane of the filament is maintained in a fixed position in the lamp at all times.

In FIGS. 27–41, there is shown the electrical circuitry utilized in the sensing, decoding, and allied electrical operations of the machine. The relay contacts therein are shown in the position they assume when no power is applied to the machine. The circuit specifications which have been included in the drawings, have been included, by way of example only, as suitable for a record sorting machine adapted to sort rapidly. It is to be understood that the machine has great flexibility and that the circuit specifications may readily be varied according to the particular application intended.

THE START SYSTEM

*Figs. 27–29*

Outlets 500 are provided for the machine for connection to a suitable source of power such as 115 volts A.C., 60 cycles per second. The outlets section comprises suitable outlets for receiving either two pronged or three pronged plugs and also contains suitable fuses.

One end of the outlets is connected through a fuse to the upper ends of the parallel connected primary windings 502 of a transformer 503 and the other end is connected to a terminal of the motor 505 and the rotor of power switch 84. The pole of switch 84 is connected to a terminal of power indicator light 86, to the lower ends of the primary windings 502 and to terminal 1 of the power supply relay K102. A time delay relay K101 has one of its terminals 5 connected to the upper end of primary windings 502, its terminal 5 being coupled to its terminal 7 through a capacitance, terminal 7 being connected to terminal 2 of relay K102. A capacitance 507 is connected across relay K102. The other terminal of the power indicator light 86 is connected to the upper ends of primary windings 502. The stop switch S10 controlled by stop button 90 on the control panel, which is normally in the closed position, has its contact 1 connected to terminal 1 of relay K103 and its contact 2 connected to contact 4 of start switch S9, S9 being normally in the open position and controlled by start button 88. Start switch S9 normally has its contact 1 connected to terminal 7 of time delay relay K101 and to terminal 2 of relay K102, and its contact 2 connected to terminal 2 of relay K103. Contact 3 of switch S9 is connected to contact 1 of the card jam switch S4. The other terminal of motor 505 is connected to contact 8 of relay K103. A capacitance 509 is connected across relay K103 similar to K102.

When power switch 84 is turned on, the circuit is completed to the time delay relay K101. When start switch S9 is closed, after a period determined by relay K101 contact 5 of relay K103, which is connected to terminal 2 of K103 which is in turn connected to contact 2 of switch S9, closes with contact 4 of relay K103 when the relay energizes in a circuit to the other side of the power source through contacts 1, 2 of switches S10, S4 and S3, respectively. The closing of contacts 8 and 7 of both relays K103 and K102 results in the completion of the circuit to motor 505.

With start switch S9 back in the open position, the circuit is through contacts 1 and 2 of S3, S4 and S7–1 through S7–14, contacts 8 and 7 of card sense relay K1, contacts 1 and 2 of stop switch S10, and contacts 1, 2, 4 and 5 of relay K103, to contacts 7 and 5 of time delay relay K101, and the A.C. source. Also, from the A.C. source, through motor 505, and closed contacts 8 and 7 of relay K103.

Contacts 1 and 2 of index switch S3 are normally in contact with each other, contact 2 being connected to the power switch 84 and contact 1 to contact 2 of card jam switch S4. Contact 1 of card jam switch S4 is connected to contact 1 of the first full pocket switch S7–1 and to contact 3 of start switch S9. Contact 3 of index switch S3 is connected to a terminal of index indicator light 99, the other terminal of light 99 being connected to contact 7 of relay K101. Contact 3 of switch S7–1 is connected in parallel with all contacts 3 of full pocket switches S7–2 through S7–14. Contacts 1 and 2 of full pocket switches S7–1 through S7–14 are connected in series contact 2 of switch S7–14 being connected to contact 7 of card sense relay K1. Contacts 3 of switches S7–1 through S7–14 are connected to one terminal of an indicator lamp 99, the other terminal of which is connected to relay K101.

When it is desired to turn the index wheel to permit setting the selector for a desired column, switch S3 is actuated closing contacts 2 and 3 thereof completing the circuit through the associated indicator light and opening the circuit to the motor stopping the latter. The same effect occurs when the card jam switch S4 and any of the switches of the S7 group are actuated.

THE POWER SUPPLY

Figs. 27–30

Secondary section 512 of transformer 503 provides power to photocell exciter lamps 188 and the heater voltages to the filaments of the electron discharge tubes of the position sense circuit. These heater voltages are schematically depicted in FIG. 36.

Secondary section 514 is center tapped to ground through an inductance 516 and has its upper and lower ends connected to the plates 518 and 520 of thyratron rectifiers 508 and 510 respectively. Secondary section 522 is connected to the interconnected cathodes 524 and 526 of the rectifiers and a lead 523 tapping its center is connected to one terminal of a control panel interlock S8, the other terminal of interlock S8 being connected through a resistance 531 to contact 5 of relay K102. Lead 523 is grounded through parallel connected capacitance 528 and resistance 530.

Secondary section 532 has its upper end connected through a resistance 536 to grid 534 of thyratron 508 and its lower end connected to the grid 538 of thyratron 510 through a resistance 540. A lead 541 connected to the center of section 532 by a tap is connected to contact 3 of relay K102. Lead 541 is grounded through a capacitance 546; is connected to a lead 549 connected by a tap to the center of secondary section 548 through a resistance 543, and is connected to a point on variable resistance 544 through a resistance 542, resistance 544 being grounded through a resistance 545.

Lead 549 of secondary section 548 is connected to contact 4 of relay K102. The lower end of section 548 is connected to the plate 550 of a voltage regulator tube 552 and to the positive side of a capacitance 556 through a crystal diode 554 poled in the forward direction of current flow, the other side of capacitance 556 being connected to lead 549. The upper end of secondary section 548 is connected to the positive side of capacitance 556 through a crystal diode 558 also poled in the forward direction of current flow. The plate 550 of tube 552 is connected to the end of resistance 554 and its cathode 553 is grounded.

When the power to the machine is turned on but time delay relay K101 has not yet energized, the circuit flows from the positive side of capacitance 556 to the tap on resistance 554 through contacts 3 and 4 of unenergized relay K102 to the other side of capacitance 556. Because of this, a negative D.C. voltage appears at the junction point of resistance 542 and contact 3 of relay K102 so that the voltage applied through center tap of secondary transformer winding 532 to the grids of the thyratrons is negative and they are maintained at cut off.

After the period for time delay relay K101 to be energized, a circuit now exists from the positive side of capacitance 556 through resistances 544 and 545, ground, resistance 530, control panel interlock S8, resistance 531 closed contacts 4 and 5 of energized relay K102 to the low side of capacitance 556. Another circuit is completed from the high side of capacitance 556, the tap on resistance 544, resistance 542 and resistance 543 to the low side of capacitance 556. As a result a substantial positive voltage appears at the junction of resistances 543 and 542 and the grids of the thyratrons are driven positive to render the thyratrons conductive. The B plus supply output voltage on lead 523 consequently builds up, the maximum voltage appearing at end 547 of resistance 530 being determined by the voltage regulating action of tube 552 across resistances 544 and 545, and a regulated B plus supply is provided. With the circuit constants shown in the figures, this is 115 volts D.C. The connection between inductance 516 and resistance 530 through ground permits inductance 516 to fulfill its function as a choke.

Since plate 518 of thyratron 508 is connected to the cathode 561 of a voltage regulator tube 560, which has a grounded plate 559, through a resistance 562 and crystal diodes 564 and 566 poled in the reverse direction of current flow, and through parallel combination 567 of resistances 568 and 570, when positive half cycles of A.C. voltage appear at plate 518, no current flows through resistance 562. Current does flow when the negative half cycles appear thereat and the rectified output at cathode 561 of tube 560 provides the regulated B minus supply. With the circuit constants shown in the figures, minus 108 volts, D.C. is provided.

THE SENSING AND DECODING SYSTEM

Figs. 30, 31, 32, 34, 35 and 37

To condition the machine for upper or lower field sensing, switches 581 and 583 (see FIG. 30) are provided, upper switch 581 being associated with key 96 and lower switch 583 with key 97. Upper switch 581 has its contact 2 connected to a terminal of the upper field photocell 588, contact 1 connected by a tap grounded through a capacitance 586 to a point on a variable resistance 590, contact 3 connected to one terminal of its associated indicator light 99 and contact 4 to the B plus supply. Lower switch 583 has its contact 1 connected by a tap grounded through a capacitance 598 to a point on variable resistance 592, its contact 2 connected to a terminal of lower field sensing photocell 596, its contact 3 connected to a terminal of its associated indicator light 99 and its contact 4 connected to the B plus supply. The other terminals of lights 99 are grounded and the other terminals of photocells 588 and 596 are connected to the left grid 598 of a twin triode tube 600. The said other terminals of photocells 588 and 596 are grounded through a ballast resistance 599. Resistances 590 and 592 are connected at one of their ends to ground through a resistance 594, and at their other ends to the B minus supply.

The left half of tube 600 which with associated circuitry is an amplifier has its cathode 602 connected to the junction point of resistances 604 and 606 and its plate 608 connected through a resistance 610 to the control grid 612 of the inter-card detector thyratron 614, to the junction point of resistances 616 and 618 connected between grid 620 of the right half of double triode 600 and the grid 622 of the left half of a double triode tube 624, and through resistance 626 to plate 628 of tube 624. The right half of tube 600 and the left half of tube 624 together with their associated circuit elements comprise phase inverter and cathode follower stages respectively. Plate 630 of the phase inverter stage is connected to the B plus supply through a resistance 632 as is the plate 634 of a gas diode 636, the cathode 638 of tube 636 being connected to the B minus supply through a resistance 640 and also being connected to a control panel interlock S50 with its associated contact breaker "A." Contact breaker "A" is timed to close at 356° and open at 28° of machine operation. The other terminal of the contact breaker "A" control panel interlock is connected to the control grid 642 of card sensing thyratron 644.

Plate 628 of the cathode follower is connected directly to the B plus supply and the cathode 646 thereof is connected to the B minus supply through series connected resistances 648 and 650. The junction point of resistances 648 and 650 is connected to the common segment of a commutator 652 which is adapted to rotate synchronously with the card feeding mechanism. The right half of tube 624 which is a clamp stage has its plate 654 connected to the B plus supply through resistance 632, its grid 656 connected to the B minus supply through a resistance 658 and to the plate 660 of inter-card detection thyratron 614 through a resistance 662. Cathodes 620 and 664 are grounded. Inter-card detection thyratron 614 has a grounded cathode 64 and its plate 660 is connected through a resistance 666 to a terminal of the control panel interlock S–53 with its associated contact breaker "D," the other terminal of interlock S–53 being connected to the B plus supply. Contact breaker "D" is timed to close 170° and open at 150° of machine operation.

The commutator segments other than the common segment and the group sort segment, are all respectively connected to the grids of position sensing thyratrons 668 through 678. Each of these grids is also connected to the B minus supply through a resistance shunted by a capacitance. All the cathodes of these thyratrons are grounded. The plates of the thyratrons 668 through 678 are connected through the respective sockets in the "Position Sensing" section of the connection panel to their associated relays. The plate of thyratron 668 is connected through a resistance to the junction point of terminals 2 and 1 of relays K48 and K49 respectively and through a crystal diode to respective terminals 1 and 2 of the relays. Similarly the plate of thyratron 670 is so connected to relays K46 and K47, the plate of thyratron 672 to relays K44 and K45, the plate of thyratron 674 to relays K43 and K51 and the plate of thyratron 676 to relays K42 and K50. The plate of thyratron 678 is connected through a resistance to terminal 1 of relay K41 and through a crystal diode to terminal 2 thereof. Terminal 2 of the card sensing relay K1 is connected to the B minus supply through a resistance 680 and diode 682 and connected to the B plus supply through contact breaker "C." Contact breaker "C" is timed to open at 330° and close at 350° of machine operation. The grid 642 of card sensing thyratron 644 in addition to being connected to control panel interlock S50 is also connected to ground through a series combination of a resistance 684 shunted by a capacitance 686 and a resistance 688. The plate 690 of thyratron 644 is connected through a resistance 692 to terminal 1 of card sensing relay K1.

In FIGS. 28, 29, 31 and 32 there is shown the relay matrix for decoding the sensed cards. The contacts are numbered with the numerals of the relays by which they are controlled. FIG. 33 shows the code employed in the figures for numbering the relay contacts.

Figure 30:
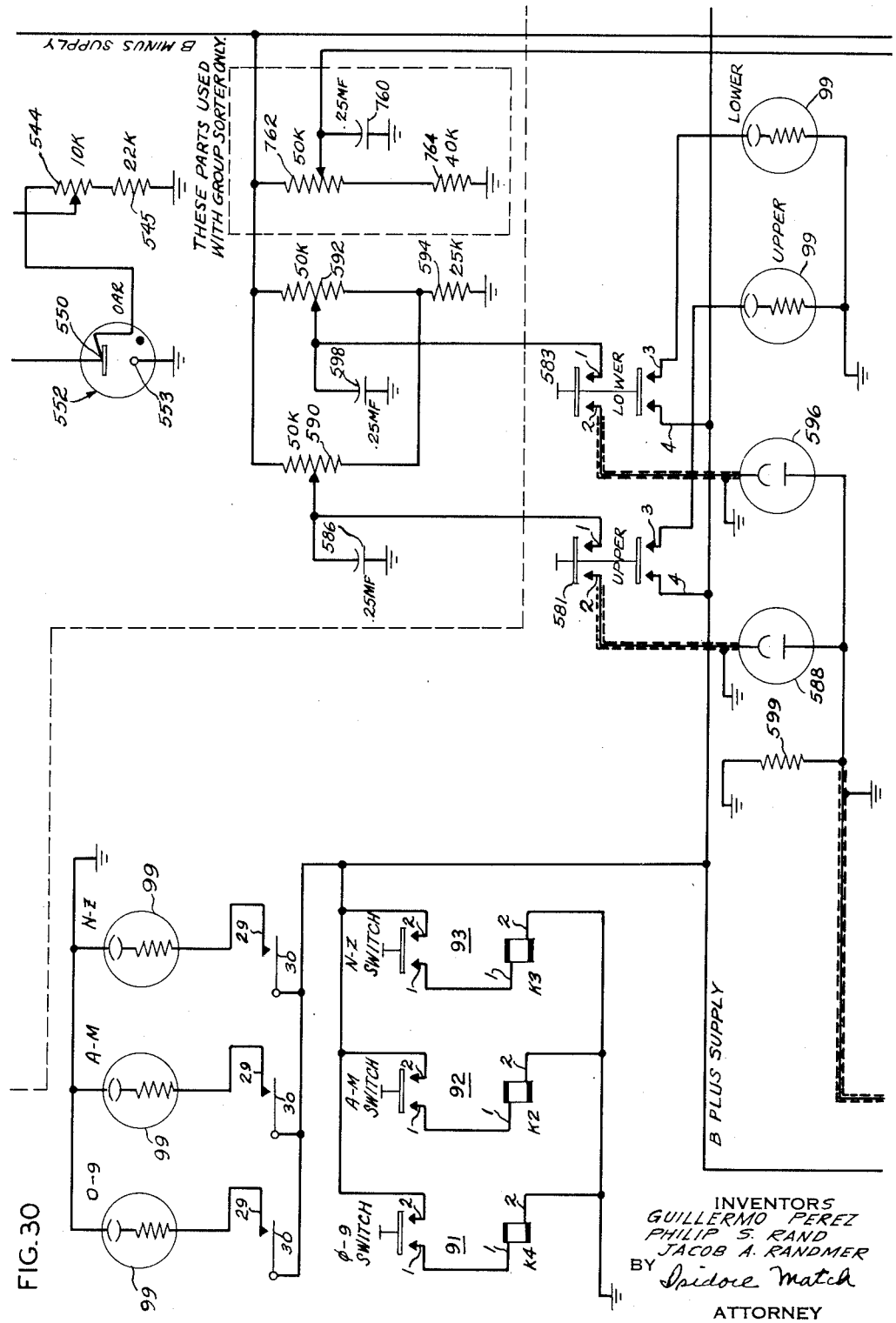
Figure 31:
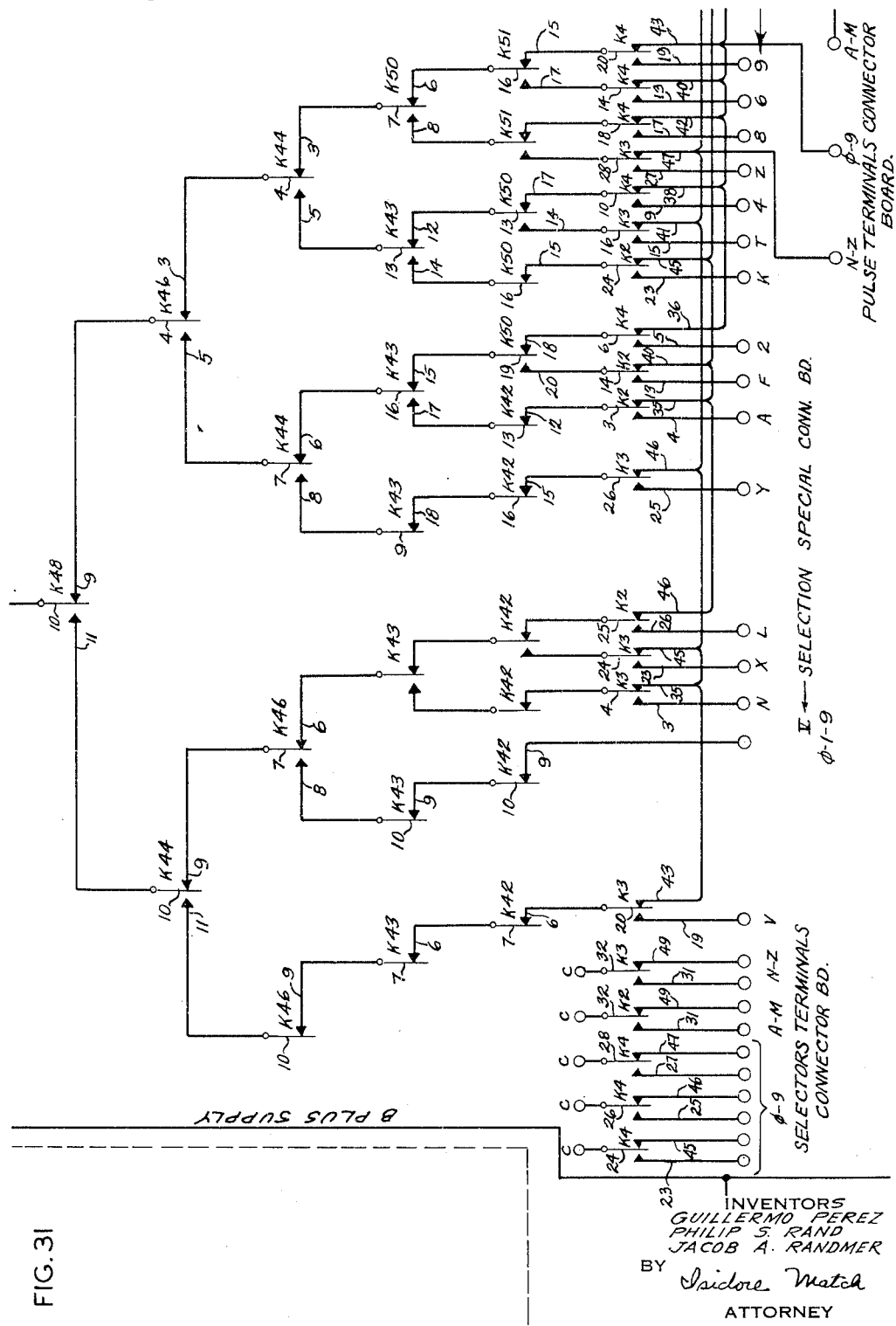

Relays K4, K2 and K3 shown in FIG. 30 are utilized in determining whether the cards will be sorted for 0–9, A–M or N–Z characters and are each energized by switches associated with keys 91, 92 and 93 respectively. Contacts 1 of the switches are connected to contacts 1 of their corresponding relays. Contacts 2 of the switches are connected to B plus supply and contacts 2 of the relays are grounded. Contacts 30 of the respective relays are all connected to the B plus supply and contacts 29 are connected to one terminal of the respective indicator lights 99, the other terminals of the indicator lights being grounded.

Figure 37:
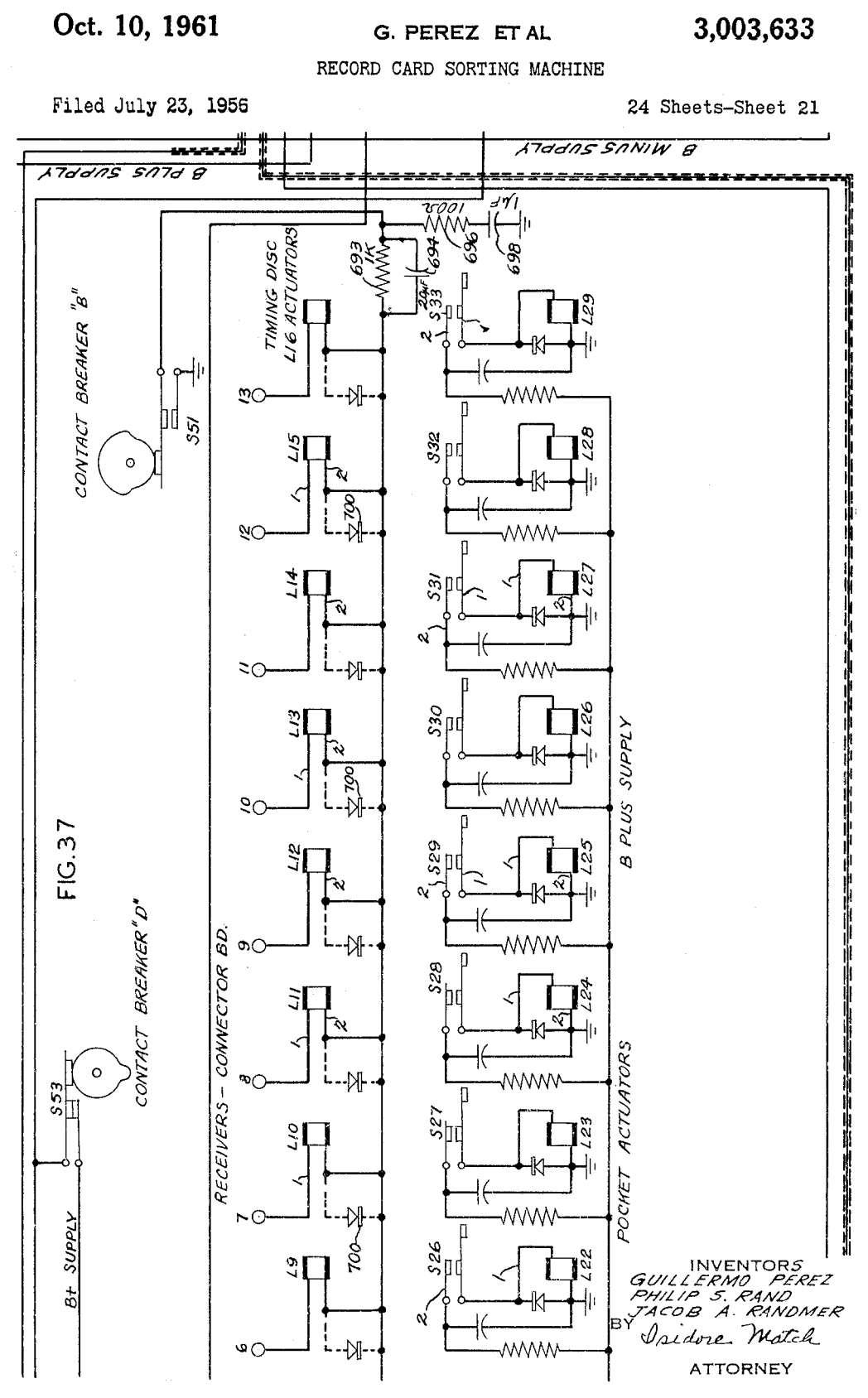

The timing disc actuators, 13 in all, are shown in FIGS. 35 and 37. Each has an electromagnet L4–L16 having one end connected to a corresponding socket in the "Receivers" section of the connection panel and their other end connected to ground through series connected parallel combination of a resistance 693 and a capacitance 694, resistance 696 and capacitance 698. The junction of resistances 693 and 696 is connected to a terminal of control panel interlock S51 and its associated contact breaker "B" the other terminal of S51 being grounded. Contact breaker "B" is timed to close at 182° and open at 326° of machine operation and completes the circuit to ground. A crystal diode 700 employed alternatively for isolation purposes in place of a direct lead when the counting feature is used is connected between terminal 2 of each electromagnet L4–L16 and resistance 693.

The pocket actuator circuits shown in FIGS. 35 and 37 each comprise a switch S21 through S33 having contacts 1 and 2, contact 1 being connected to terminal 1 of an electromagnet, each switch contact 2 being connected through a resistance to the B plus supply. A crystal diode is connected between terminals 1 and 2 of each electromagnet, and a capacitance is connected between terminal 2 of the electromagnet and contact 2 of each switch, S21–33. Terminal 2 of each electromagnet is grounded.

In the operation of the machine certain preliminary steps are first taken. A stack of cards to be sorted is first placed in card magazine 50. Assuming the cards are desired to be sensed for numerical characters which would entail upper field sensing, first the "Position Sensing" portion of the connection panel is wired by connecting respective wires between corresponding pairs of horizontally adjacent sockets in the (A) and (B) rows therein. The "Character Selection" section (D–P, 2–7) is wired by connecting with wires, the sockets in the 6 row to the corresponding sockets in the 5 row, the sockets in the 4 row to the sockets in the 3 row and the sockets in the 2 row to the sockets in the 1 row in the "Receivers" section. Now power switch 84 is turned on, index key 95 is depressed and the index wheel is turned until the desired column to be sensed is reached on column indicator scale 89 at which point index key 95 is released. The upper key 96 is depressed to condition the machine for sorting the upper half card columns. Key 91 is depressed to set the machine for sorting a numerical selection. The remainder of this portion of the description will be concerned with the sensing of a card having a 9 character punched therethrough. This card will wind up in pocket 13 as seen by the wiring on the connection panel set forth hereinabove.

Prior to the feeding of the first card into the sensing section, upper field photocell 588 is sensing light from an exciter lamp 188. Due to the low resistance thereacross when it is so sensing light, a low voltage is applied to grid 598 of the amplifier stage thereby providing a relatively high voltage of the plate 608. This results in the application of a high voltage to the grid 622 of the cathode follower stage and a high voltage from the junction point of resistances 648 and 650 to the common segment of commutator 652. As the commutator rotates, with no cards being fed into the sensing section, the commutator brush applies the high cathode follower voltage to the 0, 1, 3, 5, 7 and 9 segments of the commutator which in turn apply this voltage to the respective grids of the position sense thyratrons 668 through 678 rendering them conductive. As the latter thyratrons fire, their associated decoding relays are energized, but are deenergized between 330° and 350° of machine operation when contact breaker "C" opens and then closes. The deenergization takes place since the B plus supply voltage is removed from the plates of the position sensing thyratrons when contact breaker "C" opens.

While the upper field sensing photocell 588 remains "in the light," the voltage at plate 608 of the amplifier stage remains high. This high voltage applied to grid 612 of the inter-card detection thyratron 614 fires the latter causing the voltage at its plate to become low. The latter low voltage which is applied to grid 656 of the clamp stage biases the clamp stage to plate current cut off. This makes the voltage at plate 654, the B plus voltage thus removing a negative voltage clamp from plate 630 of the phase inverter stage. At the same time, the high plate 608 voltage from the amplifier is applied to the grid 620 of the phase inverter stage rendering it conductive and the low voltage resulting thereby at plate 630 results in a low voltage being applied to plate 634 of gas diode 636. Thus, with contact breaker "A" open between 28° and 356° of machine operation, the grid 642 of card sense thyratron floats and when contact breaker "A" is closed, the low voltage across gas diode 636 maintains card sense thyratron 644 at cut off. Card sense relay K1 remains unenergized and a decoding or reading circuit cannot be completed at this time.

When the card having the punched "9" on the column being sorted is fed into the machine, the leading edge thereof interrupts the light beam to upper field sensing photocell 588. Since the latter is now "in the dark," a positive voltage is applied to grid 598 of the amplifier stage resulting in a low output voltage at plate 608 which is applied to the grid 620 of the inverter stage as a negative going signal. Since the negative clamp voltage has been removed from plate 630, the voltage at plate 630 goes high. Now, when contact breaker "A" closes at 356°, since the sensing photocell 588 has remained "in the dark," the voltage at plate 630 of the phase inverter stage remains high and this high voltage is applied through gas diode 636 to the grid 642 of card sense thyratron 644 causing it to fire and energize its associated card sense relay K1. At 28°, contact breaker "A" opens removing the positive voltage from the grid of thyratron 644 but since B plus supply voltage is applied to plate 690 through contact breaker "C", thyratron 644 is not extinguished and relay K1 is not deenergized until 330° when contact breaker "C" opens.

As the first card being fed passes over the 0, 1, 3, 5 and 7 blank card positions, the commutator brush moving in synchronization with the card feed mechanism contacts successively the 0, 1, 3, 5, and 7 commutator segments. However, since the output voltage from the cathode follower stage applied to the common segment of the commutator is low due to the photocell's remaining "in the dark," position sense thyratrons 668 through 678 are maintained non-conductive.

When the upper field punched "9" position aligns itself with the card plate hole and photocell 588, the voltage developed thereacross decreases. The application of the latter low voltage to grid 598 of the amplifier stage causes its output voltage to rise the higher voltage being applied to the cathode follower stage. The consequent relatively high cathode follower output voltage provided at the junction of resistances 648 and 650 is applied through the common segment of the commutator, and the 9 position segment to the grid of position sensing thyratron 678 causing the latter to fire and the consequent energization of relay K41. Thyratron 678 remains fired and relay K41 energized until 330° of machine operation, at which time, contact breaker "C" opens.

As the card travels on through the sensing section, the punched 9 position hole in the card moves beyond the card plate hole and the commutator brush moves off the 9 position segment. When the machine arrives at the 150° point of machine operation, contact breaker "D" opens removing the B plus supply voltage from the plate 660 of inter-card detector thyratron 614 causing the latter to be extinguished. At the 170° point, contact breaker "D" closes reapplying B plus supply voltage to plate 660. However, since upper field sensing photocell 588 remains "in the dark," the plate 608 voltage of the amplifier stage and the grid 612 voltage of thyratron 614 remain low and the latter stays extinguished. However, the plate voltage of thyratron 614 remains high due to the application thereto of B plus supply voltage applied through closed contact breaker "D". This high plate voltage results in a high voltage at the grid 656 of the clamp stage causing conduction therein with a resulting low plate 654 voltage. The consequent low plate voltage from the clamp stage when applied to the plate 630 of the inverter stage renders the latter non-conductive. The clamp remains applied until the sensing photocell 588 detects light between moving cards at which time it is removed prior to the sensing of the next card.

At 182° contact breaker B closes and the decoding or reading circuit is completed. The card sense relay K1 has remained energized due to the photocells detecting "dark" as a card passed through the sensing section when contact breaker "A" closed. The closing of contact breaker "B" completes the selected decoding circuit. The decoding circuit is completed through contacts 4 and 5 of energized card sense relay K1, contacts 4 and 5 of energized character 9 decoding relay K41, contacts 10 and 9 of unenergized character 0 of decoding relay K48, contacts 4 and 3 of unenergized character 1 decoding relay K46, contacts 4 and 3 of unenergized character 3 decoding relay K44, contacts 7 and 6 of unenergized character 7 decoding relay K50, contacts 16 and 15 of the unenergized character 5 decoding relay K51, contacts 20 and 19 of energized character 0–9 group relay K4 to the 9 socket in the "Character Selection" section of the connection panel. Since this socket has been wired to "Receivers" section socket 13, the circuit continues through the connection panel wiring to the timing disc actuator L16, RC network comprising capacitance 694 and resistance 693, and contact breaker "B" to ground. Thus, timing disc actuator L16 is energized.

The energized timing disc actuator L16 armature extension contacts the timing disc trip latch which in turn trips the timing disc pawl as shown in FIG. 5 which illustrates the timing mechanism. The pawl will remain tripped for 12 card feed cycles at which time the sensed card will have traveled to its pocket (pocket 13). The tripped pawl contacts its wiper lever which is rocked and rotates its shaft. The latter, while rotating closes the pocket actuator contacts S33 to complete the pocket actuator circuit. When this circuit is closed, the B plus supply voltage is applied through the resistance associated with S33, contacts 1 and 2 of S33, electromagnet L29 to ground energizing L29 so that its shutter finger raises at a time that the leading edge of the card destined for pocket 13 is 0.625 inch therefrom and the card is deflected into the pocket. The timing disc member continues to rotate and its associated wiper lever is restored to its normal position. As a result, pocket actuator contacts S33 open and actuator L29 is deenergized. The capacitor and crystal diode associated with the pocket actuator magnet provide surge suppression thereto, the back E.M.F. produced by the collapsing magnetic field being bypassed therethrough. As the timing disc member continues its rotation, the reset stud on the pawl rides against its reset cam which causes it to be restored to its normal position. When the machine arrives at the 326° point, contact breaker "B" opens, breaking the decoding or reading circuit and the electromagnet L16 of the timing disc actuator is deenergized.

When the machine arrives at the 330° point of operation, contact breaker "C" opens, removing the B plus supply voltage from the card sense and position sense thyratrons 644 and 673 and their plates are consequently driven negative by the B minus supply voltage through resistance 689. This causes these thyratrons to be extinguished with the consequent deenergization of card sense relay K1 and the character 9 decoding relay 41. Thus, the machine is cleared.

The same wiring arrangement on the connection panel is utilized in the alphabetical sorting. For each column of alphabetical sorting, the process is almost identical to the numerical sorting with the exceptions that two sorts are required for each column. For the initial sort of a column, the A–M code selection key 92 is depressed and the cards punched with the A–M codes will be sorted into their respective 13 card pockets. The cards punched with the N–Z codes will fall into the reject card receiver.

The procedure for sorting on a card column where some of the cards are punched with alphabetical information and others with numerical information is practically the same as numerical sorting except that re-sorts are required for card column. First a sort is made with the 0–9 code selection key 91 depressed and then successively with the A–M and N–Z code selection keys 92 and 93 respectively depressed.

To sort out a file of cards of only those punched with desired codes, it is only necessary to wire the "Character Selection" sockets for those codes to the desired "Receivers" sockets, and depress the proper code selection key on the control panel. For example, let it be assumed that it is desired that the codes to be selectively sorted are those punched "0" and those punched 6 in the card column on which the sorting is to take place. The 0–9 code selection key 91 is depressed with all position sockets in the "Position Sensing" section wired on and the 0 and 6 sockets in the "Character Selection" are wired to individual "Receivers" sockets, for example 1 and 2 respectively. Although the A–M and N–Z selection sockets are also wired at this time, that wiring does not enter into the operation. The 0 cards will sort into card pocket 1, the 6 cards into pocket 2, and the balance of cards will go to the reject card pocket, i.e., pocket 14.

If it is desired to make a selective alphabetical sort, for example, those punched either with A, E, P, or T in the card column on which the sorting is to take place, both the A–M and N–Z code selection keys 92 and 93 are depressed, all position sockets in the "Position Sensing" section are wired on, the A socket is wired to "Receivers" socket 1, the E socket to "Receivers" socket 3, the P socket to "Receivers" socket 5 and the T socket to "Receivers" socket 7. Of course, the choice of "Receivers" is optional. Any code or combination of codes may be directed to any socket depending upon the sequence desired. With the example given, the A cards will sort into the pocket 1, the E cards into pocket 3, the P cards into pocket 5, and the T cards into pocket 7. The balance of the cards will be received in the reject cards pocket 14. If it is desired to make a selection numerical and alphabetical sort, for example, with those cards punched either numerically 1, 4, B, D, O or S in the card column on which the sorting is to take place, all 3 code selection keys 91, 92, and 93 are depressed, and all position sockets in the "Position Sensing" section are wired on. In the panel, character B is wired to receiver socket 1, character O to receiver socket 2, character D to receiver socket 4, character 1 to receiver socket 5, character S to receiver socket 6, and character 4 to receiver socket 8, the choice of the receiver sockets, of course, being optional. In one run of the cards through the machine, the cards containing the codes to be selected are sorted into the respective card pockets to which these codes are wired. The balance of the cards are fed to the reject card pocket.

A "Blank" selection is a card on which no sensing occurs. This may be an unpunched card column or a column punched with the positions in the "Position Sensing" section wired off so that no code or other selection is formed. The receiving of "Blank" selections is not under the control of any of the three code selection keys 91, 92 and 93. The sorting of a "Blank" into a card pocket is obtained merely by wiring from a "Blank" selection socket to the desired "Receivers" socket. For example, if it is desired to make a sort of numerical cards with the unpunched cards to be sorted ahead of the 0 cards, the 0–9 card selection key 91 is depressed, the 0–9 "Character Selection" sockets are wired to individual "Receivers" and a "Blank" selection is wired to the number 3 "Receivers" socket. The unpunched cards will sort into pocket 3, the 0 cards into pocket 4 and the balance of the numerical codes will be sorted into the corresponding card pockets. The unpunched codes can be received with the 0 cards on a numerical sort by wiring the "Blank" selection to the 0 selection. In this case, both the unpunched cards and the 0 cards will sort into pocket 4. When the file of cards contains alphabetical and numerical codes as well as "Blanks," the 0–9 "Blank" cards can be directed to the card pockets while the alphabetical cards would be rejected on subsequent runs. By depressing either the A–M or N–Z code selection keys 92 or 93 respectively, the A–M and N–Z cards can be sorted.

If it is desired to sort by card column position rather than code, the "Position Selection" section may be required or not depending upon the punching in the cards. For example, when the sort is to be for all 6 positions with but one position punched in the sorting column or columns of individual cards, the sorting operation would be a straight numerical sort. The cards would be received as 0's, 1's, 3's, 5's, 7's, and 9's. "Position Selection" would not be required and there would be just a conventional numerical sort with the proper wiring. When the sort is to be for all 6 positions with the possibility of more than one position being punched in the sorting column or columns of individual cards, the "Position Selection" section would be required to define the multiple punching as position rather than codes. In this situation all "Position Sensing" sockets are wired on for full sensing. The wiring of the "Position Selection" sockets to "Receivers" sockets may be "Position Selection" 0 to "Receivers" 1, 1 to 2, 3 to 3, 5 to 4, 7 to 5, and 9 to 6. The cards punched in the individual positions will be received according to the position wiring. Where two or more positions are sensed from one card, that card will be received according to the position wire to the lower numbered receiver.

Selective sorting by card column position rather than by code may be accomplished quite readily through the use of the "Position Selection" section. Selective position sorting may also be accomplished to a more limited degree without "Position Selection." When "Position Selection" is used, the selective sort may be for one or more positions with one or more positions punched in individual cards. For example, the cards to be selectively sorted are those punched in the 1 position as well as those punched in the 9 position. The setting of the code selection keys is not important. All "Position Sensing" sockets may be wired on for just sensing although two sockets such as the 1 and 9 are all that are necessary. The 1 and 9 in the "Position Selection" section are wired to two sockets such as the 4 and 9 sockets of the "Receivers" section respectively. The cards punched in the 1 position will be sorted into the 4 card pocket, those punched in the 9 position will be sorted into the 9 card pocket and any cards punched in both the 9 and 1 positions will be sorted into the 4 card pocket. To perform selective position sorting without the use of "Position Selection," assuming that the cards punched in position 9 in a code column are to be selectively sorted, the 0–9 code selection key 91 is depressed. The 9 socket in the "Position Sensing" section is wired to its on socket, the balance of the output sockets are wired off and the 9 character selection socket is wired to the 8 receiver socket. The cards punched in the 9 position will be sorted into the number 8 card pocket. The balance of the cards will feed through to the reject code receiver.

It is seen from the above with the flexibility of the connection panel and the circuitry of the machine many arrangements can be made. Thus, it is also possible to have special character sorting, combined receiving, any combination of numerical and alphabetical sorts etc.

GROUP SORT DEVICE
FIGS. 31, 32 and 34–37

Group sorting card control permits the sequencing of individual groups of detail cards in accordance with the punching in related master cards. Each group of one or more detail cards is preceded by the master card which contains the punched information used to classify its associated detail card. With card control group sorting, the detail cards may contain punched information in the column in which the group sorting is to be performed. Control punching in the master card permits selections from these cards only. The punching in the detail cards is not sensed.

By interconnecting the two connection panel sockets marked "G" and "S," a group sorting is effected. With such connection, sensing will occur only from a card containing the group sort control punching. Conveniently, this may be the 0 character in card column 45. Since the group sorting sensing photocell is contained in a rear hold-down shoe (not shown in the drawings containing the photocell block 176) moving the latter block beyond columns 37 and 82 on the record cards pushes the rear hold-down shoe and the group photocell out of alignment with the "0" hole punched in column 45 so that group sorting is conveniently done only in columns 1–37 and 46–82.

When the group sorting sockets "G" and "S" are connected, sensing and clearing is performed by the machine only with those cards containing the control punch, i.e., "0," column 45. The sensed information from the first control or master card is stored until a second master card punched in the "0" position in column 45 is sensed at which time the information stored from the first master or control card is cleared and the new information is stored from the second card. The stored information in a master card determines the sorting of all the following cards regardless of their punching. The sensing photocells in the photocell block function in the same manner as in the individual sort. The group sensing photocell is mounted within the rear hold-down shoe in the lower field sensing position and detects the presence or absence of the group sort control punch one-half card cycle ahead of the sensing photocells in the photocell block.

Column 45 of a group sort master card may contain 1, 3, 5, 7 and 9 punching in addition to the "0" control. However, only one position such as the "0" position is the only position effective for group sorting control. All detail cards may contain column 45 punching in all positions other than the "0" position.

When group sorting is to be performed, the file of cards must first be arranged so that the individual groups of detail cards will follow a related group of sorted master cards. The file thus arranged, however, is not in sequence according to the sequence of the master cards. Before making such an arrangement, the data contained in the file or files of the master cards on which the group sorts are to be made should be recorded within the range of card columns 1–37 and 46–82 and each master card is punched with the zero in column 45. Should it be desired to make a straight alphabetical or numerical group sort, the connection panel would be wired for basic character sorting as previously described and the only additional wiring would be the interconnection of the "G" and "S" sockets. For example, assuming the situation where the file in the master cards on which a numerical group sort is to be made is punched in card columns 10, 11 and 12, in this case, the column indicator 89 would be set at column 12, the upper key 96 and the 0–9 code selection key 91 would be depressed. After the sorting on column 12, the cards would be removed from the pockets in sequence and the column indicator would be moved up column 11. After the sorting on column 11, the cards would again be removed from the pockets in sequence and the column indicator would be moved to column 10. When the column 10 sorting is completed, the cards are then in numerical sequence of the codes punched in columns 10 to 12 of the master cards.

The circuit utilized is shown in FIG. 38. Grid 622 of tube 624 (see FIG. 34) of the cathode follower stage is connected to contact 9 of a plate load group sort relay K201, contact 10 thereof being connected along with socket "G" of the connection panel to the junction of resistances 688, 604 which provides a reduced B minus supply of minus 22 volts. Contact 3 of relay K201 is connected to contact breaker "C" through crystal diode 682 and contact 4 is connected to the B plus supply voltage. Terminal 1 of relay K201 is connected through a resistance 710 to contact breaker "D" and terminal 2 is connected to the plate 712 of a thyratron 714. A capacitance 716 is connected between terminals 1 and 2 of relay K201. The grid 718 of thyratron 714 is connected to the group sort commutator segment of commutator 652 and through a series arrangement of an RC network 720 comprising a capacitance 722 and a resistance 724, resistance 726 and resistance 728 to the plate 730 of the right half of tube 732, the right half of the latter with its associated circuit components being adapted to provide a negative voltage clamp. Cathode 734 of thyratron 714 is connected to ground and the "S" socket from the connection panel is connected to the junction of resistances 726 and 724.

The cathodes 736 and 738 of a double triode tube 737 are connected to the B minus supply through a resistance 740 and grounded through a resistance 742 and the plates 744 and 746 are connected to the B plus supply through resistances 748 and 750 respectively. The grids 752 and 754 of tube 737 are tied together and are connected to a terminal of a grounded ballast photocell 756 and a terminal of the group sort sensing photocell 758, the other terminal of photocell 758 being connected by a tap grounded through a capacitance 760 to a resistance 762 which has one end connected to the B minus supply voltage and its other end grounded through a resistance 764. Plate 744 is connected directly to the group sort segment of commutator 652. Plate 746 is connected to grid 766 of tube 732 through a resistance 768.

Plate 770 of a thyratron 772 is connected through resistance 774 to contact breaker D. Plate 770 of thyratron 772 is connected to plate 776 of gas diode 778, the cathode 780 of which is connected through a resistance 782 to grid 784 of tube 732, grid 784 being returned to the B minus supply through a resistance 786. Grid 766 is returned to the B minus supply through a resistance 768. A gas diode 790 has its plate 792 connected to plate 730, and its cathode 794, returned to the B minus supply through a resistance 796, is connected to the grid 798 of thyratron 772 through a resistance 800. The cathodes 736 and 738 of tube 737 are tied to the cathode 802 of tube 732. Plate 806 of tube 732 is connected directly to plate 744 of tube 737.

In operation, with sockets "G" and "S" not connected, the plate 712 of thyratron 714 is connected to the B plus voltage supply through relay K201 and contact breaker "D." The grid 718 is at a high positive voltage since it is connected to the B plus supply voltage through resistances 724 and 726. Accordingly, thyratron 712 conducts and relay K201 is energized for the period that contact breaker "D" remains closed, i.e., 170° to 150°. Contacts 9 and 10 of K201 open removing a negative voltage (—22 volts D.C. with the circuit constants shown) i.e., the clamp from the grid 622 of the cathode follower stage of tube 624 permitting tube 264 to operate normally on a position sense function. Contacts 3 and 4 of relay K201 open removing the short for the position sense relays around contact breaker "C" so that normal machine clearing of the position sense relays takes place when contact breaker "C" opens.

When the "G" and "S" sockets are connected, a negative voltage bias (—22 volts with the circuit constants shown) is applied to grid 718 of thyratron 714 to place it under control of the group sort commutator segment. Thyratron 714 remains extinguished until a "0" card column position is detected at column 45 by the group sort card control sensing photocell 758. While thyratron 714 is extinguished, its plate load relay K201 is deenergized thereby preventing normal machine sensing and clearing from taking place. The latter occurs because the deenergization of relay K201 applies the negative voltage to the grid 622 of the cathode follower stage to prevent it from operating on a position sense circuit function. However, since the card sensing circuit does not involve the cathode follower, that circuit functions normally. With the deenergization of K201, contacts 3 and 4 thereof also close thereby effecting the application of the B plus supply voltage to the plates of position sense thyratron 668 through 678, by-passing contact breaker "C." Thus, when contact breaker "C" is open between 330° and 350° of machine time, closed contacts 3 and 4 of relay K201 prevent the normal position sense clearing circuit operation since any thyratron 668 through 678 which may have been fired will remain fired. However, card sense thyratron 644 will be extinguished when contact breaker "C" opens due to the action of crystal diode 682 and the voltage divider formed by resistances 810 and 812. When contact breaker "C" opens, the B plus supply voltage is removed from the plate of thyratron 644 and a negative voltage (—35 volts D.C. with the circuit constants shown) is applied thereto from the junction of resistances 810 and 812 through relay K1. The crystal diode 682 will not conduct as the B plus supply voltage is now applied to its right side and the negative voltage to its left side, current flow is halted and as a consequence thereof, card sense relay K1 is deenergized.

MASTER CARD OPERATION

The circuit operation resulting when a master card containing the group sort control (0, column 45) is explained hereinbelow in four stages, i.e., A, B, C and D:

*Stage A.*—Group sort sensing photocell 758 is in the light between cards prior to sensing the master card.

*Stage B.*—Group sort sensing photocell 758 is sensing dark at the leading edge of the master card.

*Stage C.*—Group sort sensing photocell 758 is sensing the "0" position, column 45.

*Stage D.*—Position sensing of the master card on the column being sorted.

STAGE A

In the light between cards, group sort sensing photocell 758 has a minimum resistance. Thus, the voltage developed thereacross will be low since the voltage applied thereto through the tap on resistance 762 is negative. This low voltage is applied to the grids of tube 737. Cathode 736 of tube 737 is at a negative voltage (—37 volts D.C.) due to the voltage divider action of resistances 740 and 742. Plate 744 is at a relatively low voltage due to its connection to plate 806 of tube 732 as will be further clarified. The low voltage applied to grid 754 from photocell 758 due to its sensing light results in a high voltage at plate 746 and grid 766 of tube 732 with a consequent low voltage at plate 730. The low voltage at plate 730 coupled to the grid 798 of thyratron 772 through gas diode 799 and resistance 800 maintains thyratron 772 non-conductive and with contact breaker "D" in a closed position, the voltage at plate 770 remains high. This high voltage is applied through gas diode 778 to the left grid 784 of tube 732 causing a resulting low voltage at plate 806 which is the clamp for plate 744 of tube 737. Since resistance 748 is common to plates 806 and 744, when either the left half of tube 737 or 732 is conducting, the voltage at their plates is low. Thyratron 714 remains extinguished due to the negative grid bias applied from the "G" and "S" sockets and relay K201 remains deenergized resulting in the negative voltage clamp remaining applied to grid 622 of the cathode follower to prevent sensing and to result in the continuous applications of the B plus supply voltage to the plate of thyratrons 668 through 678 to prevent clearing.

STAGE B

When the group sort sensing photocell 758 is placed "in the dark" due to the passing thereover of the leading edge of a master card, its resistance is at a maximum and the voltage developed thereacross is relatively high. This high voltage applied to the right grid 754 of tube 737 causes the voltage at plate 746 and at grid 766 to decrease with a consequent rise in voltage at plate 730. This high voltage, coupled to grid 798 of thyratron 772 renders it conductive and causes its plate voltage to decrease. The low voltage at plate 770 is coupled to the left grid 784 of tube 732 so that the resulting high voltage at plate 806 causes the removal of the clamp from plate 744 of tube 737. The voltage at plate 744 remains low however since the voltage at grid 752 is high due to photocell's 758 detecting "dark." The removal of the clamp from plate 744 thus takes place prior to the detection of the group sensing photocell 758 of the master card control ("0," column 45) and the clamp remains off until contact breaker "D" opens to cause the extinguishing of thyratron 772. When contact breaker "D" closes thereafter, the high plate voltage of thyratron 772 is applied to the left grid 784 of tube 732 rendering it conductive and applying the clamp to plate 744 of tube 737.

STAGE C

As the master card containing the control moves into position to permit the group sort sensing photocell 758 to sense the punched "0" position in column 45, the commutator brush contacts the group sort segment. Since photocell 758 is mounted in the lower field position and the "0" punch is in the upper field position, the sensing takes place one-half card cycle prior to normal position sensing. In the light, the voltage developed across photocell 758 is low and the voltage applied to grid 752 of tube 737 is correspondingly low. Since the clamp has been removed, the voltage at plate 744 increases and this voltage applied through the group sort segment of the commutator 652 to the control grid 718 of thyratron 714 causes it to fire with the consequent energization of relay K201 through contact breaker "D." This causes contacts 9 and 10 and 3 and 4 of relay K201 to open removing the negative voltage (—22 volt D.C. with the circuit constants shown) from grid 622 of the cathode follower stage and removing the B plus supply short across contact breaker "C." Thus, there is permitted normal sensing of the colum sorted on the master card and any decoding relays energized from a previous master card are deenergized when contact breaker "C" opens, thereby, clearing the information set up by the previous master card.

STAGE D

Thyratrons 714 and 772 remain fired until the 150° point of machine operation at which time contact breaker "D" opens. The position sensing circuit functions between 356° of the previous card cycle and 122° of the master card cycle. Such timing allows the information in the sorted column in the master card to be fully sensed and stored in the associated decoding relays.

At 150°, when contact breaker "D" opens, relay K201 is deenergized and the negative voltage clamp (—22 volts) is applied to grid 622 of the cathode follower stage. This will make position sensing ineffective for the ensuing detail cards. With relay K201 deenergized, the B plus supply voltage, as explained hereinabove, is applied to the position sense thyratron plate thus preventing the operation of a clearing operation for all following detail cards.

Each new card cycle whether detail or master initiates stages A and B. However, stages C and D do not function without a master card having the group control ("0," column 45) punched therein.

THE COUNTING CIRCUIT

*FIGS. 39 and 39A*

Counter actuators utilized in connection with this circuit are connected in parallel with the timing disc actuator and the counter circuit becomes a part of the decoding circuit of the machine. The counters operate independently of the timing disc actuators. The cards may be sorted according to the same or different selections than those used for counting or kept in their original order while counting. A card count can be obtained for a tally of cards in an entire run by utilizing the "CC" section on the connection panel; the "CC" section emitting an impulse each time a card passes through the sensing section. If a nullified count device is part of a counter which is utilized, the "C" section in the connection panel emits an impulse each time a card passes through the sensing section except when a selection impulse is nullified by the selection count to give the nullified count as will be further explained hereinbelow. Generally, the "0" counter is wired to the "C" socket of the "Nullified Count" section. The counter actuators shown in FIG. 41 each comprise an electromagnet having one end connected to terminal of contact breaker "B" and the other end connected to the proper socket in the "Counters" section of the connection panel.

When a punched card position is sensed in the sensing stage, decoding relays corresponding to the punched card positions are energized. At the 182° point, contact breaker "B" closes completing the decoding or reading circuit. The latter circuit is completed through the card sense relay K1 and various energized decoding and group relay contacts to the "Character Selection" section of the connection panel corresponding to the code sensed. In counting, the impulse from the connection panel "Character Selection" section is wired to the pocket "Receivers" section and to the "Counters" section. This wiring completes the decoding circuit in parallel through the selected timing disc actuators and counter actuators to contact breaker "B." The selector counter actuator operates a counter mechanism and adds the digit "1" to the figure accumulated on counter wheels.

In FIG. 39 there is shown the nullified count circuit. FIG. 39A shows the filament heater voltages for the tubes used therein. An additional power supply is necessary as a beam power amplifier is used which requires a B plus voltage of 250 volts and cannot operate on the 115 volts D.C. from the main power supply. When wired, the "C" socket is connected through a counter socket, and the 0 counter to a terminal of contact breaker B.

The voltage across secondary winding 812 of a transformer 810 is rectified by bridge rectifier 814, one end of the rectifier 814 providing 250 volts D.C. which is applied to the plate 816 of power tube 818, the other end of rectifier 814 being connected to the B plus supply. Parallel connected capacitance 820 and resistance 822 provide the filter for the rectifier output.

A double triode 824 has its left grid 826 connected to ground through series connected resistances 830 and 832 and connected to the B minus supply through a resistance 828. The junction of resistances 830 and 832 is connected to the "U" socket of the connection panel. Cathode 834 of tube 824 is grounded through a resistance 836 and connected to the B minus supply through a resistance 838. Plate 840 is connected to the output of rectifier 814 through a resistance 842 and to the plate 844 of gas diode 846. Cathode 848 is connected to ground through a resistance 850 and to the B plus supply through a resistance 852. Plate 854 is connected directly to the grid 856 of tube 824, to the cathode 858 of tube 846 through a resistance 860 and through resistances 860 and 862 to the B minus voltage supply. The cathode 864 of the power tube 818 is grounded through unbypassed resistance 866 and directly connected to contact 10 of card sense relay K1. Contact 11 of relay K1 is connected to the "C" socket on the connection panel. The counter wired to the "C" socket is thus prevented from counting blank machine cycles.

In the normal state with no input voltage at the "U" socket (no card is passing through the sensing section), the voltage at grid 826 is low and high at plate 840. The high plate 840 voltage is lowered by the drop across gas diode 846 and is further lowered by the drop across resistance 860. This latter lowered but still high voltage is applied to the control grid 870 of power tube 818 causing a relatively high voltage output at cathode 864. The voltage at cathode 864 is applied through contacts 10 and 11 of energized card sense relay K1 to "C" socket on the connection panel. When contact breaker "B" closes at the 182° point of machine operation, the 0 counter becomes the load for the power amplifier and is impulsed to count. Contacts 10 and 11 of card sense relay K1 when closed complete a connection from the cathode 864 of tube 818 to the connection panel socket "C." When no cards are passing through the machine contacts 10 and 11 are open so that no impulse is emitted from socket "C."

When the "U" socket receives an impulse (a counted card), the "C" socket will not emit an impulse. The positive input signal applied to grid 826 of tube 824 through the "U" socket and resistance 830 causes the voltage output at plate 840 to drop sufficiently so that the voltage drops across gas diode 846 and resistance 860 results in a negative voltage at plate 854 driving the right half of tube 824 to cut off. The negative voltage from plate 854 which is impressed on the grid 870 of tube 818 drives the latter to cut off thus removing a voltage from socket "C." Thus when contact breaker "B" closes at 182° point of machine operation, the "0" counter is prevented from operating.

While there have been described what are considered to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

We claim:

1. A machine for sorting cards bearing intelligence in accordance with a selected code in the form of perforations through discrete positions arranged in spaced columns thereon comprising means for feeding the cards into the machine at uniformly spaced intervals, a plurality of card receptacles, each of the receptacles being adapted to receive cards having perforations in a given position therethrough, a light source, photoresponsive means disposed in opposing spaced relation with said source for generating a voltage in response to light therefrom, means for conveying said cards in continuous movement from said card feeding means to said receptacles in a path wherein a column on a card passes between said light source and said photoresponsive means whereby each of the positions in said column is successively placed in registration with said light source and said photoresponsive means and whereby said voltage is generated when a perforation through a given position is placed in registration with said light source and said photoresponsive means, a commutator adapted to rotate in synchronism with the card feeding means, an arcuately disposed array of a plurality of segments on the commutator, each of the segments corresponding to one of said positions in said cards, means for applying a voltage to the segments in response to the voltage generated by the photoresponsive means, a plurality of position sensing relays, each of the relays being adapted to be energized in accordance with the presence of a perforation in a discrete position, means responsive to the voltage from the commutator segments for energizing the position sensing relays, a card sensing relay, means for energizing the card sensing relay in response to a card's passing between the light source and the photoresponsive means, a plurality of timing means, each individually associated with a receptacle and adapted to be actuated in response to the concurrent energization of a position sensing relay and the card sensing relay for determining the time of opening of the receptacle adapted to receive the card having a perforation through a given position, and a plurality of pocket actuating means, each associated with one of said receptacles and adapted to be energized under control of the associated timing means when actuated for opening said receptacles to receive said cards whereby a card having a perforation through a given position is received at a chosen time in a corresponding receptacle.

2. A machine for sorting cards bearing intelligence in accordance with a selected code in the form of perforations through discrete positions arranged in spaced columns thereon comprising means for feeding the cards into the machine at uniformly spaced intervals, a plurality of card receptacles, each of the receptacles being adapted to receive cards having perforations in a given position therethrough, a light source, photoresponsive means disposed in opposing spaced relation with said source for generating a first voltage in response to light and a second voltage when in the dark, means for conveying said cards in continuous movement from said card feeding means to said card receptacles in a path wherein a column on a card passes between the light source and the photoresponsive means whereby each of the positions in said columns is successively placed in registration with the light source and the photoresponsive means, a commutator adapted to rotate in synchronism with the card feeding means, an arcuately disposed array of a plurality of segments on the commutator, each of the segments corresponding to one of the positions on the cards, means for applying a voltage to the segments in response to the voltage generated by the photoresponsive means, a plurality of position sensing relays, each of the relays being adapted to be energized in accordance with the presence of a perforation in a discrete position, means responsive to the voltage from the commutator segments for enerizing the position sensing relays, a card sensing relay, means for energizing the card sensing relay in response to a card's passing between the light source and the photoresponsive means, means for selecting the code to be sorted, a plurality of timing means, each individually associated with a receptacle and adapted to be actuated in response to the concurrent energization of a position sensing relay, the card sensing relay, and the code selecting means for determining the time of opening of the receptacle adapted to receive the card having a perforation through a given position, and a plurality of pocket actuating means for opening said receptacles to receive said cards, each adapted to be energized under control of the associated timing means when actuated, whereby a card having a perforation through a given position is received at a chosen time in the corresponding receptacle.

3. A record card sorting machine for sorting cards bearing intelligence in accordance with a selected code in the form of perforations through discrete positions arranged in spaced columns thereon comprising means for feeding the cards into the machine at uniformly spaced intervals each corresponding to a card feeding cycle, a plurality of card receptacles and associated card deflecting gates, each of the receptacles being adapted to open by operation of its associated gate to receive cards having perforations in a given position therethrough, each receptacle with its associated gate being disposed from another a distance equal to one cycle of card travel, means for conveying the cards along a path of travel common to all said card deflecting gates, a first light source, first photoresponsive voltage generating means disposed in opposing spaced relation with said source which generates respective different voltages when exposed to light and in the dark, means for conveying said cards in continuous movement from said card feeding means in a path wherein a column on a card passes between the light source and the photoresponsive means whereby each of the positions in said column is successively placed in registration with said light source and said photoresponsive means, and means in circuit with said photoresponsive means for selecting a chosen receptacle for receiving a card having a perforation therethrough in a given position and for setting the time of opening of said receptacle for receiving said card.

4. A record card sorting machine as defined in claim 3 and further including group sorting means in circuit with said selecting means whereby the receptacle for receiving detail cards is determined by a master card having a perforation through a given position in a column being sorted and a control perforation through a position on a different column.

5. A record card sorting machine as defined in claim 3 and further including counter actuating means in circuit with said selecting means for actuating counters whereby every card sensed is simultaneously counted.

6. A record card sorting machine as defined in claim 5 and further including means in circuit with said selecting means and said counter actuating means for actuating counters to count cards of one category in a group of cards having a plurality of categories.

7. A record card sorting machine as defined in claim 3 wherein said decoding means comprises a commutator adapted to rotate in synchronism with said card feeding means, the duration of one cycle of commutator rotation being slightly greater than the duration for a column of card to move between the first light source and the first photoresponsive means, an arcuate array of a plurality of segments on said commutator including a common segment, a group sorting segment and discrete segments corresponding to the positions on the cards, means for applying a voltage to the segments in response to the voltage generated by the first photoresponsive means, a plurality of position sensing means, each position sensing means corresponding to a given position, means for applying the voltage from the commutator segments to the position sensing means to energize them, card sensing means, means for applying a voltage to the card sensing means in response to the voltage generated by said first photoresponsive means whereby said card sensing means is energized, a plurality of timing means for setting the time that a receptacle adapted to receive a card perforated through a given position opens to receive said card, each of said timing means being energized in response to the concurrent energization of a given position sensing means and said card sensing means, and a plurality of pocket actuating means for opening said pockets, said pocket actuating means being adapted to be energized in response to the energization of said timing means, whereby a card having a perforation in a given position is received in the receptacle adapted for receiving the card at a predetermined time after the perforation through said card is placed in registration with said light source and said photoresponsive means.

8. A record card sorting machine as defined in claim 7 wherein said means for applying a voltage to said commutator segments in response to said voltage generated by said first photoresponsive means comprises first amplifying means having its input coupled to the output of said first photoresponsive means and its output coupled to said commutator.

9. A record card sorting machine as defined in claim 8 wherein said first amplifying means comprises a first amplifier having its input coupled to the output of said first photoresponsive means and a cathode follower having its input coupled to the output of said first amplifier and its output coupled to said commutator.

10. A record card sorting machine as defined in claim 9 wherein said position sensing means comprises a plurality of first current generating means, each having its input coupled to said commutator segments and its output coupled to a multicontact relay which is energized by the current from said current generating means.

11. A record card sorting machine as defined in claim 10 wherein said means for applying a voltage to the card sensing means in response to the voltage generated by the first photoresponsive means comprises card sensing actuating means and clamping means for said actuation means released in response to the output of said first amplifying means upon detection of light between successive cards, said card sensing actuating means having its input coupled to the output of said first amplifier and its output coupled to said card sensing means, said card sensing actuating means being adapted to apply the output of said first amplifier to said card sensing means upon release of said clamping means.

12. A record card sorting machine as defined in claim 11 wherein said means for applying a voltage to the card sensing means in response to the voltage generated by the first photoresponsive means comprises card sensing actuating means and said clamping means, said clamping means having its input coupled to the output of said first amplifier and said card sensing actuating means having its input coupled to the output of said first amplifier and to the output of said clamping means and its output also coupled to said card sensing means, said card sensing actuating means applying an actuating voltage to said card sensing means in response to an actuating voltage from said clamping means.

13. A record card sorting machine as defined in claim 12 wherein said clamping means includes a clamping amplifier and a second thyratron, said second thyratron being connected between the output of said first amplifier and the input to said clamping amplifier, said clamping amplifier applying a high voltage to the input of said card sensing actuating means when said second thyratron is in the non-conductive state.

14. A record card sorting machine as defined in claim 13 wherein said card sensing actuating means comprises a first phase inverter including an electron discharge device having at least a cathode, a plate and a control electrode and including a first gas electron discharge device, said first phase inverter having its control grid coupled to the output of said first amplifier and its plate coupled to the plate of said clamping amplifier and to the input of said first gas electron discharge device, the output of said first gas electron discharge device being coupled to the input of said card sensing means.

15. A record card sorting machine as defined in claim 14 wherein said card sensing means includes a third thyratron having its input coupled to the output of said first gas electron discharge device and renderable conductive in response to a threshold voltage therefrom, and a relay energizable in response to the current from said third thyratron.

16. A record card sorting machine as defined in claim 15 wherein said decoding means includes means adapted for applying power thereto from an outside source, means for providing regulated B plus and B minus voltages in response to said outside power, said B plus voltage being applied to the output electrodes of the electron discharge devices included in said decoding means.

17. A record card sorting machine as defined in claim 16 wherein there is further included first time controlled means for permitting the application of said threshold voltage to said third thyratron between first and second points of said cycle, second time controlled means for applying B plus voltage to said first and third thyratrons between third and fourth points in said cycle, said third point preceding said first point and said fourth point occurring after said second point and third time controlled means for applying said B plus voltage to said second thyratron between fifth and sixth points of said cycle, said fifth point occurring after said first point and said sixth point occurring after said fourth point.

18. A record card sorting machine as defined in claim 17 and further including means in circuit with said decoding means for conditioning the machine to sort in accordance with a selected code, said timing means being energized in response to the concurrent energization of said card sensing means, said position sensing means, and said code conditioning means.

19. A record card sorting machine as defined in claim 18 and including fourth time controlled means for completing an electrical circuit through the combined concurrently energized card sensing means, position sensing means and code conditioning means and said timing means between seventh and eighth points in said cycle, said seventh point occurring between said fifth and fourth points.

20. A record card sorting machine as defined in claim 19 wherein said means for providing said B plus and B minus voltage includes fourth and fifth thyratrons, each having a plate, a control electrode and a cathode common to both, means in circuit with said fourth and fifth thyratrons for rendering them conductive after a given period, voltage regulating means in circuit with the cathodes of said fourth and fifth thyratrons to provide a regulated B plus D.C. voltage and voltage regulating means in circuit with the plate of said fourth thyratron for providing a regulated B minus D.C. voltage.

21. A record card sorting machine as defined in claim 20 wherein said position sensing relays, said card sensing relay and said code conditioning means each have a plurality of contacts and the circuit to energize said timing means is completed through chosen contacts of a position sensing relay which are closed when it is energized, chosen contacts of the card sensing relay which are closed when it is energized, chosen contacts of the other position sensing relays which are closed when they are unenergized and chosen contacts of the code conditioning means when it is energized.

22. A record card sorting machine as defined in claim 21 wherein said group sorting means comprises second voltage generating photoresponsive means, a second light source, said second photoresponsive means and said second light being disposed in opposing spaced relation in a point in said card conveying path whereby a first given column passes between said second photoresponsive means and second light source prior to the time that a second given column being sensed for perforated positions therein passes between said first light source and said first photoresponsive means, a group sorting relay having a first contact coupled to the input of said cathode follower and having a second contact which is in closed position with said first contact when said relay is unenergized, said second contact being connected to a negative voltage point in one circuit whereby said cathode follower is rendered non-conductive when said relay is unenergized, third and fourth contacts of said group sorting relay which are normally in contact when said relay is unenergized connected to said B plus voltage through said second time controlled means, and means for energizing said relay in response to a voltage generated by said second photoresponsive means to open said first and second contacts to remove said negative voltage from said cathode follower and to permit thereby the energization of a position sensing relay related to a perforated position on the second column and to open thereby said third and fourth contacts to permit the deenergization of any previously energized position sensing relays when said second time controlled means opens, said relay being deenergized when said third time controlled means opens whereby said first and second and said third and fourth contacts respectively close again to reapply the negative voltage to the input of said cathode follower to prevent the energization of any other position sensing relays and to prevent the deenergization of the position sensing relay related to the perforated position on the second column.

23. A record card sorting machine as defined in claim 22 wherein said means for energizing said group sorting relay includes second amplifying means having its input coupled to the output of said second photoresponsive means and fourth current generating means for energizing the group sorting relay, said current generating means having its input coupled to the output of said second amplifying means and its output coupled to said group sorting relay.

24. A record card sorting machine, as defined in claim 23 wherein there is included means for controlling the output of the second amplifying means applied to said fourth current generating means whereby said output energizes said fourth current generating means at a given point in said cycle.

25. A record card sorting machine as defined in claim 24 wherein said controlling means comprises a series arrangement of a second gas electron discharge device having its input coupled to the output of said second amplifying means, a sixth thyratron having its input coupled to the output of said second gas electron discharge device, a third gas electron discharge device having its input coupled to the output of said sixth thyratron and second phase inverting means having its input coupled to the output of said third gas electron discharge device and its output coupled to the output of said second amplifying means.

26. A record card sorting machine as defined in claim 25 wherein the closing of said fourth time controlled means determines the time of actuation of said second phase inverting means in said cycle.

27. A record card sorting machine as defined in claim 26 wherein said nullified count means comprises means for applying a voltage through a chosen pair of contacts of said card sensing relay which are closed when said card sensing relay is energized to a counter actuating means designated to make said nullified count and means for removing said voltage in response to a signal from one of the other counter actuating means.

28. A record card sorting machine as defined in claim 27 wherein said means for applying said voltage includes third amplifying means which provides an output except at those times when a signal from a different counter actuating means is applied as input thereto.

29. A record card sorting machine as defined in claim 28 wherein said third amplifying means includes a voltage amplifier and a power amplifier having its input coupled to the output of said voltage amplifier.

30. A record card sorting machine as defined in claim 29 wherein said third amplifying means comprises said voltage amplifier, said power amplifier and voltage dropping means connected between the output of said voltage amplifier and the input of said power amplifier.

31. A record card sorting machine as defined in claim 30 wherein said voltage dropping means includes a fourth gas electron discharge device having its input connected to the output of said voltage amplifier, a resistance, a vacuum diode, said resistance being connected between the output of said gas electron discharge device and the output of said diode, the output of said diode being connected to the input of said power amplifier.

32. A record card sorting machine as defined in claim 31 wherein said voltage amplifier normally provides a positive output voltage when no voltage is applied as an input thereto and said power amplifier is a cathode follower.

References Cited in the file of this patent

UNITED STATES PATENTS

| | | |
|---|---|---|
| 1,716,677 | Wyllie | June 11, 1929 |
| 1,738,103 | Haman et al. | Dec. 3, 1929 |
| 1,927,084 | Depew | Sept. 19, 1933 |
| 2,231,494 | Dickinson | Feb. 11, 1941 |
| 2,240,557 | Estel et al. | May 6, 1941 |
| 2,285,296 | Maul | June 2, 1942 |
| 2,319,108 | Broido | May 11, 1943 |
| 2,358,051 | Broido | Sept. 12, 1944 |
| 2,438,588 | Tolson | Mar. 30, 1948 |
| 2,604,996 | Smith | July 29, 1952 |
| 2,618,386 | Samain | Nov. 18, 1952 |
| 2,717,085 | Waddington | Sept. 6, 1955 |
| 2,720,360 | Luhn | Oct. 11, 1955 |
| 2,795,328 | Tyler | June 11, 1957 |